(12) United States Patent
Walters et al.

(10) Patent No.: US 10,912,413 B2
(45) Date of Patent: Feb. 9, 2021

(54) PELLET GRILL

(71) Applicant: Phase 2, LLC, St. Louis, MO (US)

(72) Inventors: Jon Scott Walters, St. Louis, MO (US); Fu Du Feng, Taipei (TW)

(73) Assignee: Phase 2, LLC, St. Louis, MO (US)

( * ) Notice: Subject to any disclaimer, the term of this patent is extended or adjusted under 35 U.S.C. 154(b) by 0 days.

(21) Appl. No.: 15/884,406

(22) Filed: Jan. 31, 2018

(65) Prior Publication Data

US 2019/0069721 A1 Mar. 7, 2019

(30) Foreign Application Priority Data

Sep. 5, 2017 (CN) .......................... 2017 3 0432028
Jan. 25, 2018 (CN) .......................... 2018 3 0035049
Jan. 31, 2018 (CN) .......................... 2018 3 0045817

(51) Int. Cl.
*A47J 37/07* (2006.01)
*F24B 5/02* (2006.01)
(Continued)

(52) U.S. Cl.
CPC ....... *A47J 37/0786* (2013.01); *A47J 37/0704* (2013.01); *F24B 1/024* (2013.01);
(Continued)

(58) Field of Classification Search
CPC ... A47J 37/0786; A47J 37/0704; F24B 1/024; F24B 1/028; F24B 1/26; F24B 5/023
(Continued)

(56) References Cited

U.S. PATENT DOCUMENTS 4,823,684 A * 4/1989 Traeger ............... A47J 37/0704
126/10
5,429,110 A * 7/1995 Burke ................. A47J 37/0704
110/110
(Continued)

FOREIGN PATENT DOCUMENTS

CA 2776929 11/2013
CN 103989414 A 8/2014
(Continued)

OTHER PUBLICATIONS

Sherwood Industries Ltd., Black Olive Pellet Grill Owner's Manual, Publication No. C-14054, Jun. 24, 2013, 32 pages.
(Continued)

*Primary Examiner* — Phuong T Nguyen
(74) *Attorney, Agent, or Firm* — Lewis Rice

(57) ABSTRACT

A grill including an upper shell and a lower shell is provided. The lower shell defines an opening there-through, and the upper shell and the lower shell together define a cooking chamber. A pellet burner is adapted to fit in the opening in the lower shell. The pellet burner includes an air duct having a first end and a second end. The first end is positioned outside of the lower shell and the second end is positioned inside of the lower shell when the pellet burner is fitted in the opening in the lower shell. The pellet burner includes a fan positioned to blow air through the air duct and through the second end of the air duct, and a pellet box configured to hold a plurality of pellets. An auger moves the pellets to a position adjacent the second end of the air duct that contains a hot rod.

28 Claims, 15 Drawing Sheets

(51) Int. Cl.
*F24B 1/02* (2006.01)
*F24B 1/26* (2006.01)
*F24B 5/06* (2006.01)
*F24C 3/08* (2006.01)
*F24C 3/04* (2006.01)
*F24C 1/06* (2021.01)
*F24B 1/20* (2006.01)

(52) U.S. Cl.
CPC .............. *F24B 1/028* (2013.01); *F24B 1/207* (2013.01); *F24B 1/26* (2013.01); *F24B 5/023* (2013.01); *F24B 5/06* (2013.01); *F24C 1/06* (2013.01); *F24C 3/047* (2013.01); *F24C 3/08* (2013.01); *A47J 37/0754* (2013.01)

(58) Field of Classification Search
USPC ......... 99/331–333, 337, 339, 340, 349, 400, 99/444–450, 357, 419, 425, 467, 481, 99/482; 126/25 B, 25 R, 39 B, 39 D, 126/39 E, 41 B, 41 R, 38, 40, 50, 287; 219/203, 218, 260, 391, 399, 402, 492, 219/494; 426/314, 315, 520, 523, 650
See application file for complete search history.

(56) References Cited

U.S. PATENT DOCUMENTS

| | | | | |
|---|---|---|---|---|
| 5,836,295 | A | * | 11/1998 | Faraj .................. A47J 37/0718 126/25 R |
| 6,071,740 | A | * | 6/2000 | Kerouac ............. C05F 17/0072 435/290.3 |
| D717,090 | S | | 9/2014 | Harper |
| 9,237,828 | B2 | | 1/2016 | Walters et al. |
| 2014/0326233 | A1 | * | 11/2014 | Traeger ............... A47J 37/0704 126/25 R |
| 2015/0320259 | A1 | | 11/2015 | Tucker |
| 2016/0255998 | A1 | | 8/2016 | Feng et al. |
| 2016/0327263 | A1 | | 11/2016 | Traeger |
| 2017/0102149 | A1 | | 4/2017 | Nadal |
| 2017/0336076 | A1 | | 11/2017 | Walters et al. |

FOREIGN PATENT DOCUMENTS

| | | |
|---|---|---|
| EP | 3066965 | 9/2016 |
| WO | WO/2013/116946 | 8/2013 |
| WO | WO/2016/153547 | 9/2016 |

OTHER PUBLICATIONS

Sherwood Industries Ltd., Black Olive Pellet Grill Owner's Manual, Publication No. C-14036, Dec. 10, 2012, 28 pages.
Sherwood Industries Ltd., Black Olive Pellet Grill Owner's Manual, Publication No. C-13988, Oct. 2, 2012, 28 pages.
Sherwood Industries Ltd., Black Olive Pellet Grill Owner's Manual, Publication No. C13821, Jun. 28, 2012, 20 pages.
International Search Report issued for PCT Application No. PCT/US2018/031806, dated Aug. 8, 2018, 6 pages.
Written Opinion issued for PCT Application No. PCT/US2018/031806, dated Aug. 8, 2018, 9 pages.

* cited by examiner

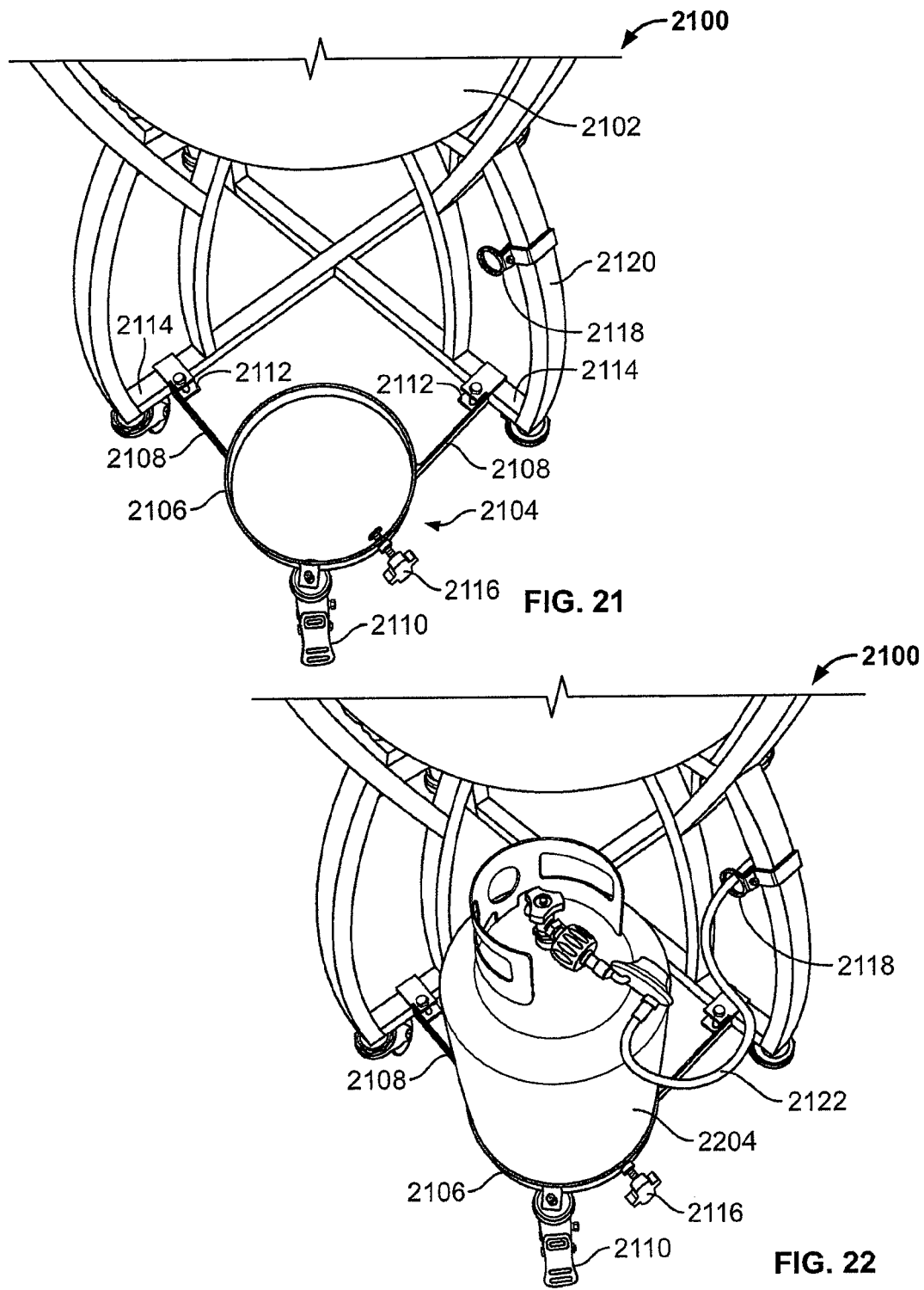

PELLET GRILL

FIELD OF THE INVENTION

The present invention generally relates to grill assemblies. These grill assemblies may burn pellets for the fuel source. The pellet burner may be easily removed and replaced with a propane gas burner or with a conventional charcoal or wood burning unit and ash tray if an alternative fuel source is preferred. The shell of the grill may be made with a material that has good insulation properties, such as clay, ceramic, refractory material, earthen material, cement rock, or terra cotta material. The shell of the grill may include a cavity therein wherein such cavity contains an insulation material. In some situations, the shell may be made using less expensive materials such as metal.

BACKGROUND OF THE INVENTION

Heavy ceramic grills and the like have burned charcoal and wood for the fuel source. Lighter metal grills have burned pellets for the fuel source. None of these grills provide the features or benefits of the present invention.

SUMMARY OF THE INVENTION

The present invention provides a grill that automatically feeds pellets into a controlled fire to maintain a preferred temperature for extended periods of time. The present invention may include an insulating shell to reduce the consumption of fuel as compared to lesser insulated grills. The present invention may also be used with other fuel sources, such as propane, natural gas, charcoal or wood, by quickly and easily replacing the pellet burner with a propane burner or with an ash tray and system for burning charcoal or wood.

In accordance with one aspect, there is provided a grill including an upper shell and a lower shell. The lower shell defines an opening there-through, and the upper shell and the lower shell together define a cooking chamber. The lower shell is substantially constructed from a clay, ceramic, refractory material, earthen material, cement rock, or terra cotta composition. A pellet burner is adapted to fit in the opening in the lower shell. The pellet burner includes an air duct having a first end and a second end. The first end is positioned outside of the lower shell and the second end is positioned inside of the lower shell when the pellet burner is fitted in the opening in the lower shell. A fan is positioned to blow air through the air duct and through the second end of the air duct. A pellet box is configured to hold a plurality of pellets and an auger is configured to move pellets from the pellet box to a position adjacent the second end of the air duct. A hot rod is positioned adjacent the second end of the air duct. A latch may releasably secure the pellet burner in the opening in the lower shell. The second end of the air duct may be positioned in a center position of the lower shell. The grill may also include a metal heat exchanger positioned at the second end of the air duct to cover a plurality of burning pellets thereunder. A lava stone may be located above the metal heat exchanger. The pellet burner may slidably mount in the opening via a track in the lower shell. The metal heat exchanger and the lava stone may be positioned in a center position of the lower shell. A temperature sensor may be adapted to sense a temperature in the cooking chamber or a temperature of a piece of food in the cooking chamber. An input switch may provide a signal indicative of a desired temperature in the cooking chamber and a control circuit may control the speed of the fan and the rate at which the auger moves pellets from the pellet box to a position adjacent the second end of the air duct as a function of the sensed temperature and the desired temperature. A gas burner interchangeable with the pellet burner may be adapted to fit in the opening in the lower shell. A fire bowl may be supported by the lower shell and an ash tray may be interchangeable with both the pellet burner and the gas burner and may be adapted to fit in the opening in the lower shell to collected ash dropped from the fire bowl.

In accordance with another aspect, there is provided a grill having an upper shell and a lower shell. The lower shell defines an opening there-through, and the upper shell and the lower shell together define a cooking chamber. Both the upper shell and the lower shell include a cavity respectively therein wherein each such cavity contains an insulation material. A pellet burner is adapted to fit in the opening in the lower shell. The pellet burner includes an air duct having a first end and a second end. The first end is positioned outside of the lower shell and the second end is positioned inside of the lower shell. A fan is positioned to blow air through the air duct and through the second end of the air duct. A pellet box is configured to hold a plurality of pellets and an auger is configured to move pellets from the pellet box to a position adjacent the second end of the air duct. A hot rod is positioned adjacent the second end of the air duct. A latch may releasably secure the pellet burner in the opening in the lower shell. The second end of the air duct may be positioned in a center position of the lower shell. The grill may also include a metal heat exchanger positioned at the second end of the air duct to cover a plurality of burning pellets thereunder. A lava stone may be located above the metal heat exchanger. The pellet burner may slidably mount in the opening via a corresponding track in the lower shell. The metal heat exchanger and the lava stone may be positioned in a center position of the lower shell. A temperature sensor may be adapted to sense a temperature in the cooking chamber or a temperature of a piece of food in the cooking chamber. An input switch may provide a signal indicative of a desired temperature in the cooking chamber and a control circuit may control the speed of the fan and the rate at which the auger moves pellets from the pellet box to a position adjacent the second end of the air duct as a function of the sensed temperature and the desired temperature. A gas burner interchangeable with the pellet burner may be adapted to fit in the opening in the lower shell. A fire bowl may be supported by the lower shell and an ash tray may be interchangeable with both the pellet burner and the gas burner and may be adapted to fit in the opening in the lower shell to collected ash dropped from the fire bowl.

In accordance with still another aspect, there is provided a grill having an upper shell and a lower shell. The lower shell defines an opening there-through, and the upper shell and the lower shell together defining a cooking chamber. A pellet burner is adapted to fit in the opening in the lower shell. The pellet burner includes an air duct having a first end and a second end. The first end is positioned outside of the lower shell and the second end is positioned inside of the lower shell when the pellet burner is fitted in the opening in the lower shell. A fan is positioned to blow air through the air duct and through the second end of the air duct. A pellet box is configured to hold a plurality of pellets and an auger is configured to move the pellets from the pellet box to a position adjacent the second end of the air duct. A hot rod is positioned adjacent the second end of the air duct. A latch may releasably secure the pellet burner in the opening in the lower shell. The second end of the air duct may be positioned in a center position of the lower shell. The grill may also include a metal heat exchanger positioned at the second end of the air duct to cover a plurality of burning pellets thereunder. A lava stone may be located above the metal heat exchanger. The pellet burner may slidably mount in the opening via a corresponding track in the lower shell. The metal heat exchanger and the lava stone may be positioned in a center position of the lower shell. A temperature sensor may be adapted to sense a temperature in the cooking chamber or a temperature of a piece of food in the cooking chamber. An input switch may provide a signal indicative of a desired temperature in the cooking chamber and a control circuit may control the speed of the fan and the rate at which the auger moves pellets from the pellet box to a position adjacent the second end of the air duct as a function of the sensed temperature and the desired temperature. A gas burner interchangeable with the pellet burner may be adapted to fit in the opening in the lower shell. A fire bowl may be supported by the lower shell and an ash tray may be interchangeable with both the pellet burner and the gas burner and may be adapted to fit in the opening in the lower shell to collected ash dropped from the fire bowl.

Other objects and features will be in part apparent and in part pointed out hereinafter.

BRIEF DESCRIPTION OF THE DRAWINGS

The drawings described herein are for illustrative purposes only of selected embodiments and not all possible implementations, and are not intended to limit the scope of the present disclosure.

FIG. 21 is a perspective top view of a support frame and a gas source cart coupled to the support frame.

FIG. 22 is a perspective top view of the support frame and the cart of FIG. 21 with a gas source coupled to the cart.

Corresponding reference characters indicate corresponding parts throughout the drawings.

DETAILED DESCRIPTION

Exemplary embodiments will now be described more fully with reference to the accompanying drawings.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
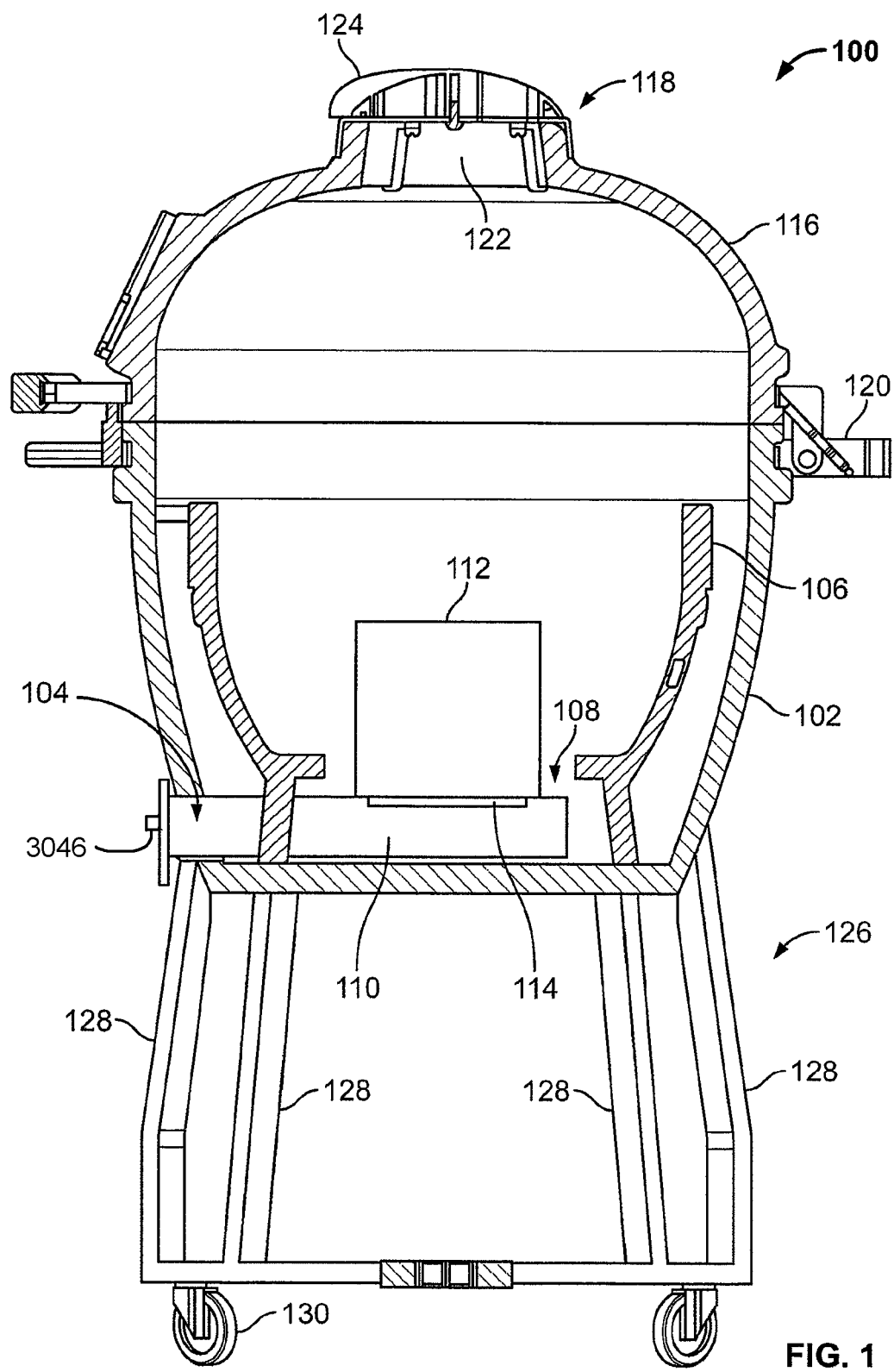
FIG. 1 is a cross sectional side view of a kamado-style grill including a unit extending through a vessel opening and a heat spreader removably coupled to the unit according to one example embodiment of the present disclosure.

A kamado-style grill assembly according to one aspect of the present disclosure is illustrated in FIG. 1 and indicated generally by reference number 100. As shown in FIG. 1, the kamado-style grill assembly 100 (sometimes referred to herein as the grill 100, the kamado-style grill 100, etc.) includes a lower shell or vessel 102 defining an opening 104 extending between an interior of the lower shell 102 and an exterior of the lower shell 102, a fire bowl 106 removably positioned within the lower shell 102 and defining an opening 108 extending between an interior of the fire bowl 106 and an exterior of the fire bowl 106, a unit 110 extending through the opening 104 of the lower shell 102 for positioning below the opening 108 of the fire bowl 106, and a heat spreader 112 removably coupled to the unit 110. The unit 110 (sometimes referred to as a gas unit 110) includes a gas burner 114 configured to radiate heat into the fire bowl 106. As seen, the heat spreaders 112/212 are of the same design and construction as the metal heat exchanger 3032 shown in FIGS. 24 and 25, and these terms are used interchangeably herein.

The heat spreader 112 is formed at least partially of a thermally conductive material to absorb heat radiated from the gas burner 114 of the gas unit 110 and spread heat away from the gas burner. Thus, the heat spreader 112 and/or the other heat spreaders disclosed herein transfer heat from one area (e.g., adjacent the burner 114) to another area. As such, the heat spreader 112 and/or the other heat spreaders disclosed herein may be considered heat exchangers.

The heat spreader 112 may allow heat to spread throughout the kamado-style grill 100. For example, if the heat spreader 112 is employed as in FIG. 1, heat normally concentrated substantially above the gas burner 114 can be spread via the heat spreader 112 to areas near the perimeter of the fire bowl 106. This allows for a more uniform temperature (and in some cases a uniform temperature) throughout the grill, including a cooking surface of the grill, compared to other grills not including a heat spreader. As such, users may experience better cooking results when using the kamado-style grill 100.

The thermally conductive material may include, for example, one or more metallic materials such as iron, aluminum, copper, steel, etc. and/or alloys thereof. The thermally conductive material can include stainless steel such as 304 stainless steel, etc. Additionally and/or alternatively, the thermally conductive material may include other suitable materials such as ceramic materials, carbon based materials, etc.

Figure 2:
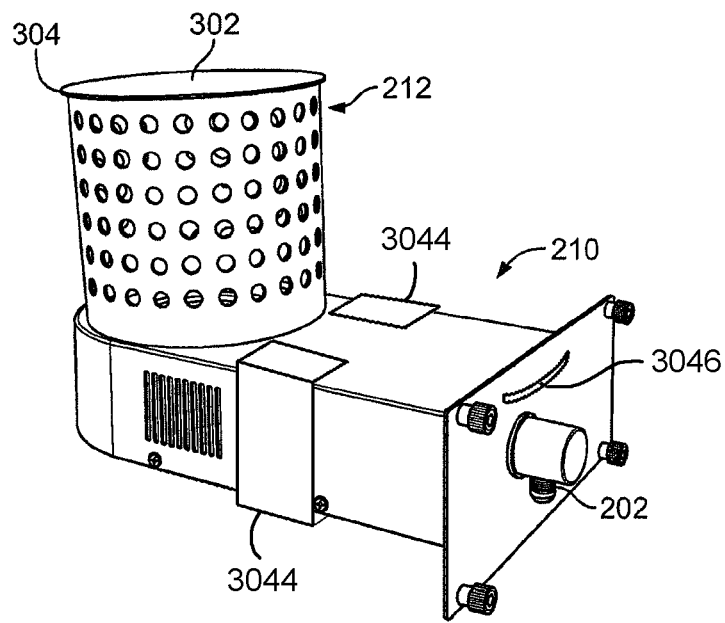
FIG. 2 is a perspective view of a removable unit and a heat spreader including perforations.

As explained above, the heat spreader 112 is removably coupled to the gas unit 110. For example, and as shown in FIGS. 1 and 2, the heat spreader 112 can rest on top of the gas unit 110. The heat spreader 112 can be removably coupled to the gas unit 110 via one or more mechanical fasteners (e.g., screws, clamps, bolts, nuts, etc.), adhesives, etc.

Preferably, and as shown in FIG. 1, the heat spreader 112 substantially aligns with the gas burner 114 when the heat spreader 112 is coupled to the gas unit 110. This allows the heat spreader 112 to substantially shield the gas burner 114 from undesirable materials such as objects falling from above the gas unit 110 (e.g., grease, dirt, etc.). As such, the heat spreader 112 may protect the gas burner 114 from the undesirable materials that may otherwise disrupt and sometimes damage the gas burner. The heat spreader 112 may be offset from the gas burner 114 when the heat spreader 112 is coupled to the gas unit 110. For example, the heat spreader 112 may overlay about half the gas burner 114 or another suitable amount if desired.

The unit 110 may be attached to the grill 100 if desired. For example, the unit 110 may be coupled to the fire bowl 106, the vessel 102 and/or another component of the grill via one or more mechanical fasteners, adhesives, etc.

The unit 110 may be a removable unit. For example, the removable unit 110 may be one of various different units insertable through the opening 104 of the vessel 102. In such examples, the opening 104 of the vessel 102 may be configured to receive another removable unit when the removable gas unit 110 is removed from the vessel 102. As such, the kamado-style grill 100 can operate as a gas fired grill when the removable gas unit 110 is inserted in the opening 104 of the vessel 102 and a charcoal fired grill, for example, when another removable unit is inserted in the opening 104 of the vessel 102.

For example, a user can remove a removable charcoal unit from the vessel opening 104 (if previously installed) and insert (e.g. slide, etc.) the removable gas unit 110 in the vessel opening 104 such that the gas burner 114 is positioned substantially below the fire bowl opening 108. After which, the user can place the heat spreader 112 on top of the gas burner 114 via the fire bowl opening 108, and optionally attach the heat spreader 112 to the removable gas unit 110 (e.g., with clamps, adhesives, etc.), as explained above.

Figure 3:
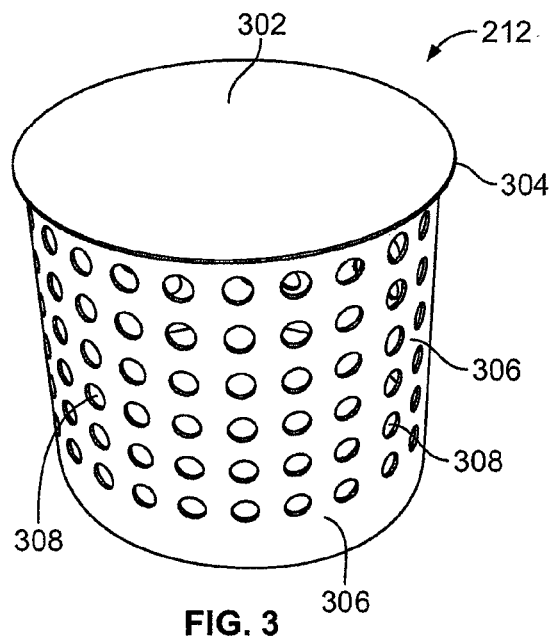
FIG. 3 is a perspective view of the heat spreader of FIG. 2.

FIGS. 2 and 3 illustrate an example heat spreader 212 and/or an example removable gas unit 210, each of which may be employed in the kamado-style grill 100 of FIG. 1 and/or another suitable grill such as those disclosed herein. As shown in FIG. 2, the removable gas unit 210 includes an input 202 (sometimes called an input gas port) for receiving flammable gas as further explained below.

The heat spreader 212 of FIGS. 2 and 3 includes a top surface 302 defining a perimeter 304 and a side surface 306 extending from the top surface 302. The top surface 302 includes a solid surface. This allows the top surface 302 of the heat spreader 212 to shield a gas burner of the unit 210 and/or another suitable unit (e.g., the unit 110 of FIG. 1) from undesirable materials, as explained above.

As shown best in FIG. 3, the side surface 306 extends from the top surface 302 on an interior side of the perimeter 304. Put another way, the top surface 302 extends beyond an edge of the side surface 306. This arrangement between the top surface 302 and the side surface 306 helps shield the gas burner from undesirable materials as explained above. Alternatively, the side surface 306 may extend from the top surface 302 at the perimeter 304 if desired.

As shown in FIGS. 2 and 3, the side surface 306 may define one or more perforations 308 to allow air to flow through the heat spreader 212. By allowing air to flow through the heat spreader, heat may spread throughout a grill (e.g., the kamado-style grill 100 of FIG. 1 and/or another suitable grill) more efficiently than with other employable heat spreaders without perforations (as further explained below).

The perforations 308 may be uniformly positioned about the heat spreader 212 as shown in FIGS. 2 and 3, or alternatively randomly positioned if desired. The perforations 308 may be circular shaped (as in FIGS. 2 and 3) and/or another suitable shape such as triangular, oval, rectangular, etc. Additionally, although the perforations 308 are uniform in size, it should be understood that the heat spreader 212 may include various sized perforations.

As shown best in FIG. 3, the heat spreader 212 is substantially cylindrical. This allows the heat spreader 212 to substantially align with a substantially circular gas burner (not shown) without wasting heat spreader material. Alternatively, the heat spreader 212 may have another suitable shape. In such cases, the shape (e.g., the cross sectional shape) of a particular heat spreader may be similar as or different than the shape (e.g., the cross sectional shape) of its corresponding gas burner.

Figure 4:
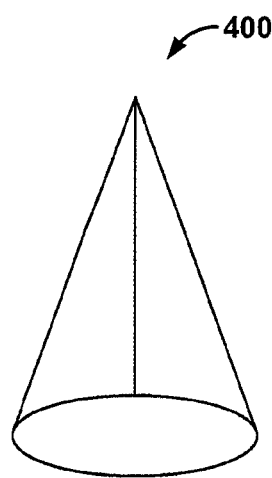
FIG. 4 is a perspective view of a conical shaped heat spreader.
Figure 5:
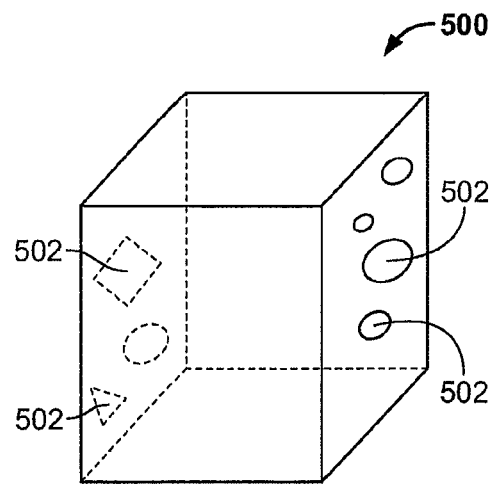
FIG. 5 is a perspective view of a rectangular shaped heat spreader.

For example, FIGS. 4 and 5 illustrate example heat spreaders 400, 500, respectively, that may be employed in the kamado-style grill 100 and/or another suitable grill. As shown, the heat spreader 400 of FIG. 4 is shaped as a cone and the heat spreader 500 of FIG. 5 is shaped as a cube. As such, the cross sectional shape of the heat spreader 400 has a similar shape as the cross sectional shape of a circular gas burner whereas the cross sectional shape of the heat spreader 500 has a different shape.

As shown in FIG. 5, the heat spreader 500 includes various sized and shaped perforations 502 on two of its opposing side surfaces to allow air to flow through the heat spreader 500. In particular, one of the side surfaces defines three perforations 502 (e.g., a triangular perforation, a rectangular perforation, and an oval perforation) while the other side surface defines four perforations 502 (e.g., oval perforations). Alternatively, other side surfaces (including adjacent side surfaces) of the heat spreader 500 may define the perforations 502. A heat spreader may not define perforations. For example, the heat spreader 400 of FIG. 4 does not include perforations.

Figure 6:
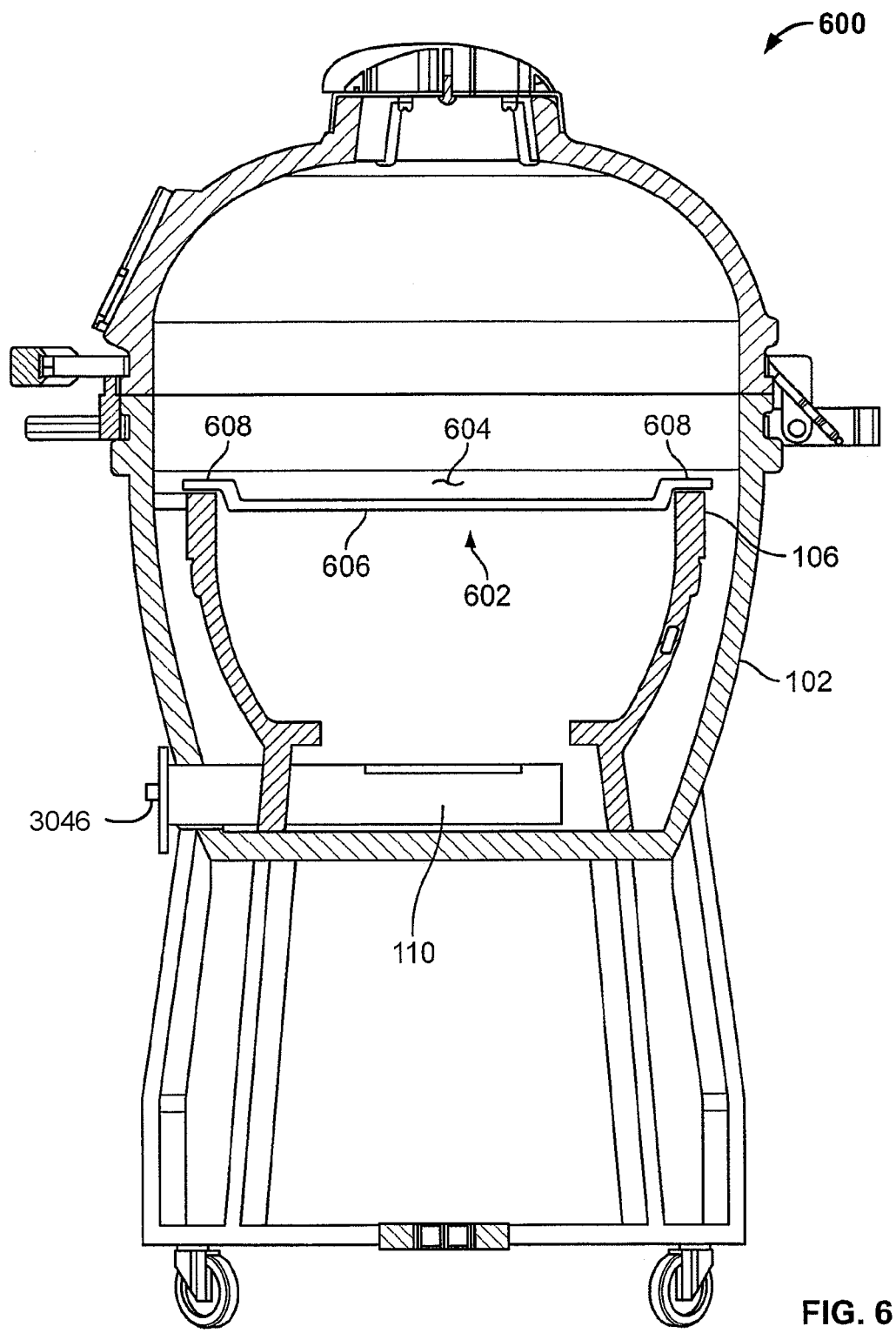
FIG. 6 is a cross sectional side view of a kamado-style grill including a support bracket for supporting a structure.

FIG. 6 illustrates another example kamado-style grill 600 substantially similar to the grill 100 of FIG. 1, but including a support bracket instead of a heat spreader. In particular, the kamado-style grill 600 includes the vessel 102, the fire bowl 106, and the unit 110 of FIG. 1, and a support bracket 602 removably coupled to the fire bowl 106. As shown in FIG. 6, the support bracket 602 extends across at least a portion of an opening 604 of the fire bowl 106 for supporting a structure (not shown).

As shown in FIG. 6, the support bracket 602 includes a transverse portion 606 and leg portions 608 on opposing ends of the transverse portion 606. In the particular example of FIG. 6, the leg portions 608 rest on a top surface of the fire bowl 106 and extend downwardly into an interior portion the fire bowl 106 through the opening 604. The transverse portion 606 extends across the opening 604 of the fire bowl 106. Put another way, the leg portions 608 are configured to allow the transverse portion 606 to extend across the opening 604 and below the top surface of the fire bowl 106. Thus, the support bracket 602 is removably coupled to the fire bowl 106 such that the support bracket 602 is positioned substantially within the fire bowl 106.

Alternatively, the leg portions 608 of the support bracket 602 may not extend downwardly into the fire bowl 106. In such examples, the transverse portion 606 extends across the opening 604 at or above the top surface of the fire bowl 106.

Additionally, the support bracket 602 may be removably coupled to the fire bowl 106 via one or more fasteners. For example, the leg portions 608 may be removably coupled to the fire bowl 106 with one or more clamps, brackets, and/or other suitable fasteners if desired.

Preferably, the support bracket 602 is removably coupled to the fire bowl 106 after the gas unit 110 and the heat spreader 112 are installed as explained above. After which, a structure (e.g., a lava stone, etc.) may be placed on the support bracket 602 as further explained below. Alternatively, the support bracket 602 may be removably coupled to the fire bowl 106 before the gas unit 110 and/or the heat spreader 112 are installed if desired.

Figure 7:
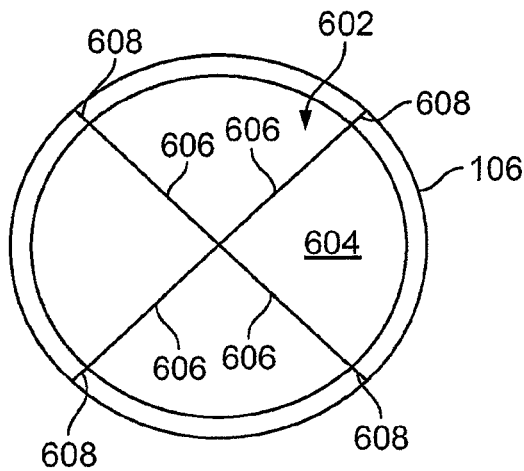
FIG. 7 is a top view of the support bracket of FIG. 6.

In the particular example of FIG. 6, the support bracket 602 includes a substantially "X" shape. For example, and as shown in FIG. 7, the support bracket 602 includes four leg portions 608 and two transverse portions (e.g., cross beams, etc.) 606 extending across the opening 604 of the fire bowl 106. The transverse portions 606 intersect each other adjacent the opening 604 of the fire bowl 106 to form the substantially "X" shaped support bracket 602.

Figure 8:
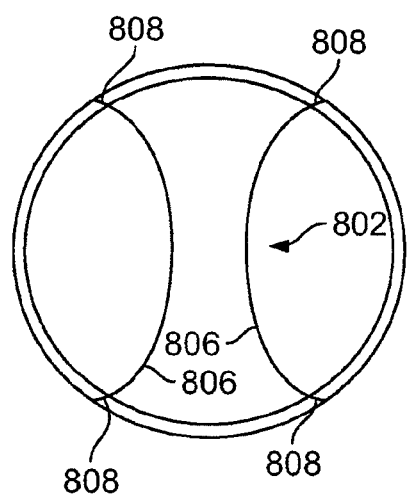
FIG. 8 is a top view of a support bracket including two nonintersecting cross beams.

Alternatively, other suitable shaped support brackets may be utilized in the kamado-style grill 600 and/or other grills disclosed herein. For example, a support bracket may include a star shaped support bracket, a triangular shaped support bracket, a rectangular shaped support bracket, etc. FIG. 8 illustrates another example support bracket 802 employable in the kamado-style grill 600 and/or other grills disclosed herein. As shown in FIG. 8, the support bracket 802 includes two transverse portions 806 and four leg portions 808 on opposing ends of the transverse portion 806. Similar to the support bracket 602 of FIGS. 6 and 7, the support bracket 802 may be removably coupled to the fire bowl 106 by resting on the top surface of a fire bowl and/or via one or more fasteners as explained above.

In the particular example of FIG. 8, each transverse portion 806 extends in an arc between its corresponding leg portions 808. This allows the transverse portions 806 to extend near a center portion of the opening 604 of the fire bowl 106 without intersecting each other. Thus, the support bracket 802 of FIG. 8 includes a shape resembling seams on a baseball (e.g., a substantially "II" shape).

Additionally, although FIG. 6 illustrates the kamado-style grill 600 as including the gas unit 110, it should be apparent that other suitable units may be employed without departing from the scope of the disclosure. For example, the grill 600 may include a charcoal related unit, a removable charcoal related unit, a removable gas unit, etc. instead of the gas unit 110

Figure 9:
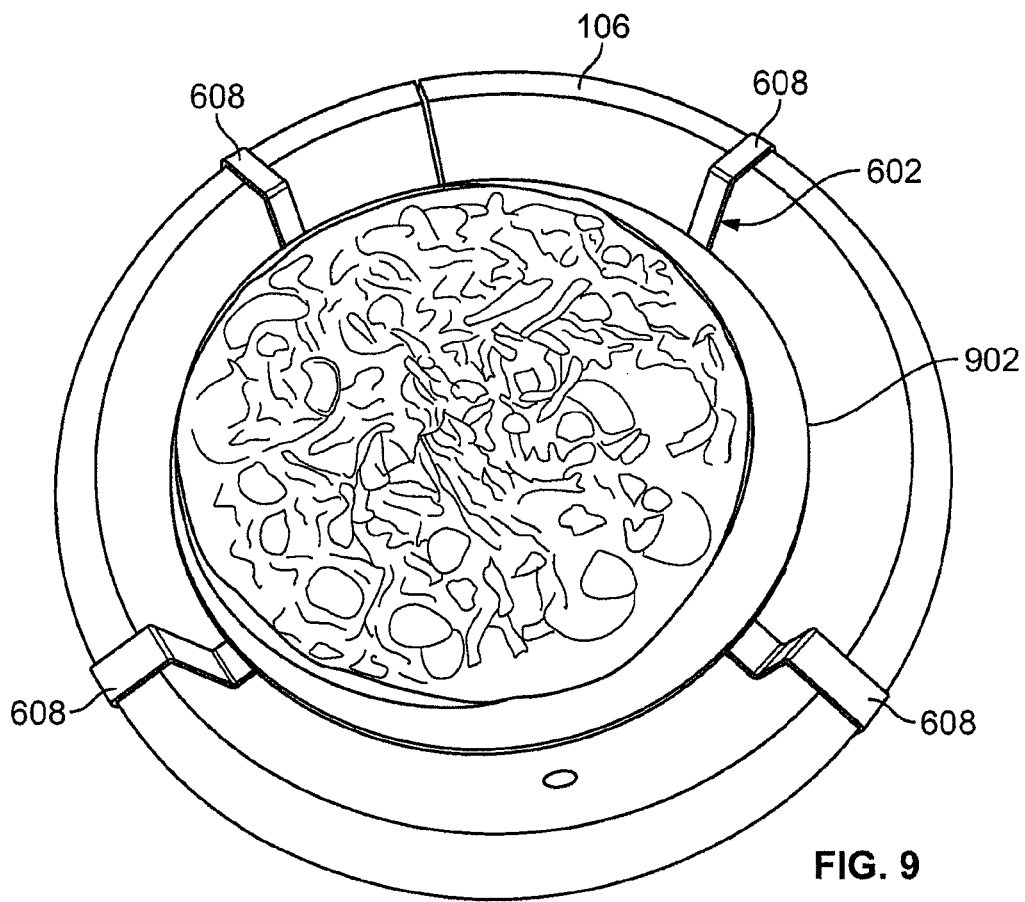
FIG. 9 is a perspective view of the support bracket of FIG. 6 supporting a structure.

As explained above, the support bracket (e.g., the support bracket 602 of FIGS. 6 and 7, the support bracket 802 of FIG. 8, and/or another suitable support bracket) supports a structure (e.g., a cooking surface, etc.). For example, FIG. 9 illustrates a structure 902 removably coupled to the support bracket 602 of FIGS. 6 and 7. In particular, the structure 902 rests on the transverse portions (not shown) of the support bracket 602 and the leg portions 608 of the support bracket 602 rest on the top surface of the fire bowl 106 as explained above.

The structure 902 can then be used, for example, as a cooking surface to cook desired items (e.g., a pizza as shown in FIG. 9, etc.). Additionally and/or alternatively, the structure 902 can spread heat across an opening of the kamado-style grill 600 and/or other grills disclosed herein. For example, food may be placed on a grate and/or another suitable cooking surface above the structure 902, directly on the structure 902 (e.g., as shown in FIG. 9), etc. In such examples, the structure 902 can spread heat across its surface and the grill's opening so that the food is evenly cooked.

In other examples, the structure 902 may vaporize liquids. For example, when a user cooks food with one of the grills disclosed herein, liquid from that food may drip onto the structure 902. This liquid that contacts the structure 902 may be vaporized (e.g., due to the temperature of the structure 902, etc.) and mix with the smoke within the grill. This causes the food, which is at least partially cooked by the smoke, to have enhanced flavors. Thus, the structure 902 may be used at least as a cooking surface, a heat spreader, and/or a vaporization device.

In the particular example of FIG. 9, the structure 902 includes a lava stone. The lava stone may be formed of natural volcanic rock and/or other suitable materials. Alternatively, other suitable structures may be removably coupled to the support bracket 602 and/or other the support brackets disclosed herein. For example, the structure may include a grate (e.g., a steel grate, etc.), a solid plate (e.g., a metallic plate, etc.), wood (e.g., cedar, etc.), other stones, etc.

Figure 10:
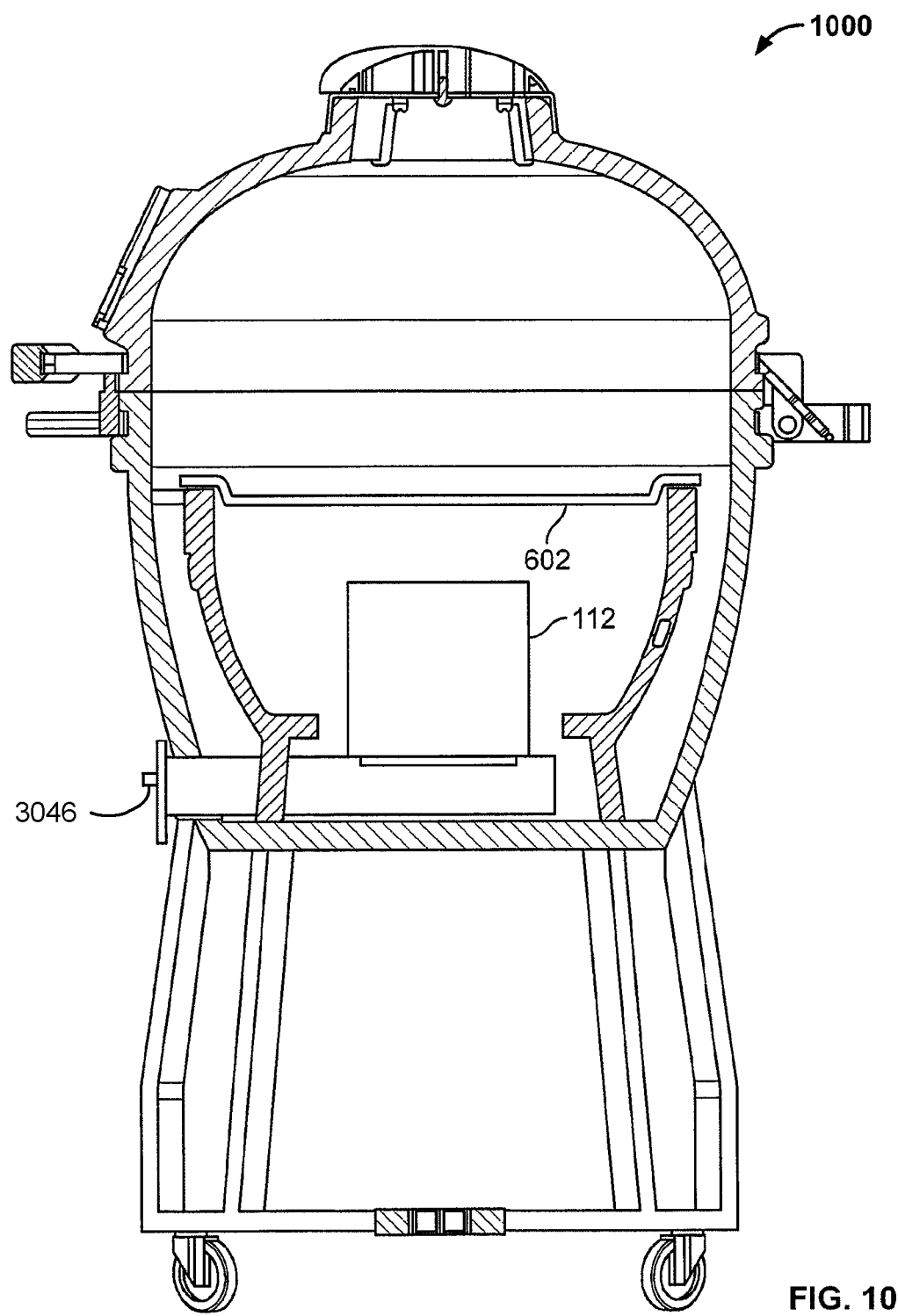
FIG. 10 is a cross sectional side view of a kamado-style grill including the heat spreader of FIG. 1 and the support bracket of FIG. 6.

The grills disclosed herein may include a heat spreader and a support bracket. For example, FIG. 10 illustrates a kamado-style grill 1000 substantially similar to the grill 100 of FIG. 1 but including the support bracket 602 of FIGS. 6 and 7 in combination with the heat spreader 112 of FIG. 1. Additionally and/or alternatively, other suitable support brackets and/or heat spreaders may be employed in the grill 1000 of FIG. 10 if desired.

The gas units (including the removable gas units, etc.) disclosed herein may include various optional components. For example, FIGS. 11 and 12 illustrate a removable gas unit 1100 including a gas burner 1114, a gas port system 1102 for receiving flammable gas, an ignition system 1104, and a housing 1118 for housing various components (e.g., conduits, etc.) of the gas burner 1114 and the systems 1102, 1104.

The housing 1118 includes a faceplate 1108, a base support 1116 removably coupled to the faceplate 1108, and a cover 1112 removably coupled to the faceplate 1108 and/or the base support 1116. As shown in FIG. 11, portions of the gas port system 1102 and the ignition system 1104 are positioned on an exterior facing side of the faceplate 1108. In particular, inputs such as gas inputs, user inputs, etc. of the systems 1102, 1104 are the positioned on the exterior side of the faceplate 1108.

Figure 11:
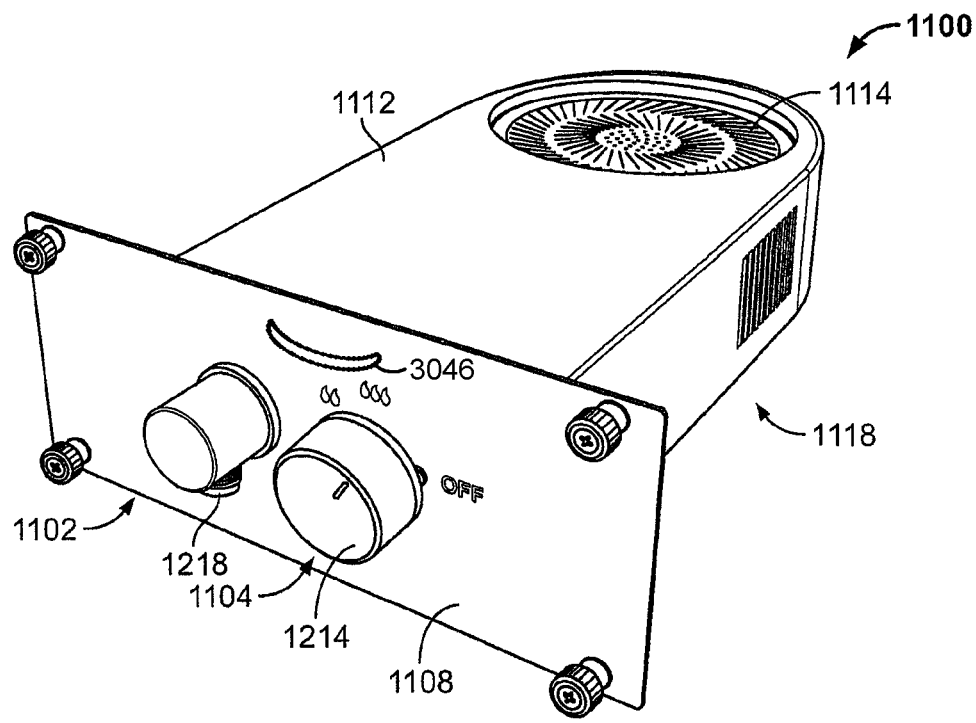
FIG. 11 is a top perspective view of a removable unit including a gas port system and an ignition system.

As shown in FIG. 11, the ignition system 1104 includes a controller 1214 including one or more user inputs to ignite the gas burner 1114, adjust an amount of flammable gas received by the gas burner, etc. For example, a user may manipulate (e.g., push, rotate, etc.) the controller 1214 to generate a spark to ignite the flammable gas. The controller 1214 may include, for example, one or more igniters such as electronic igniters which may or may not include batteries, piezo igniters, etc. that can generate the spark to ignite the flammable gas. In the particular example of FIGS. 11 and 12, the controller 1214 includes a piezo igniter.

Figure 12:
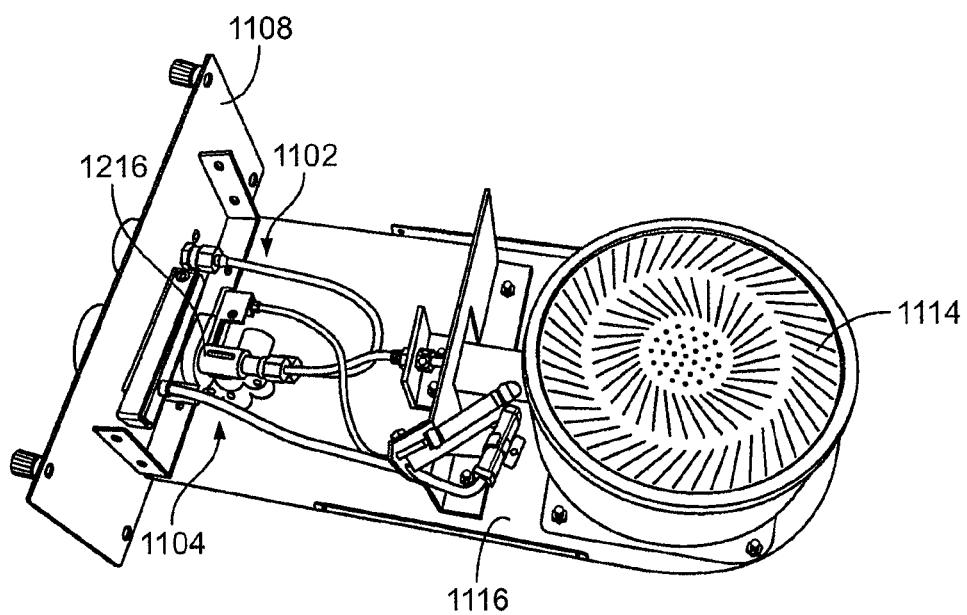
FIG. 12 is a top perspective view of the removable unit of FIG. 11 with its cover removed.

The controller 1214 of FIGS. 11 and 12 can also be used to adjust an amount of flammable gas received by the gas burner 1114. For example, a user can manipulate (e.g., push, rotate, etc.) the controller 1214 such that the amount of flammable gas from the gas port system 1102 is controlled. In the particular example of FIGS. 11 and 12, the controller 1214 is rotated to control the amount of flammable gas. The different amounts of flammable gas can be generally represented to a user by indicia such as the "OFF" label and the flame labels as shown in FIG. 11. The indicia may include letters, words, phrases, etc. For example, the indicia may include the word "HIGH", "MEDIUM", "MED", and/or "LOW", etc.

The indicia disclosed herein may represent discrete positions for a particular amount of flammable gas. For example, the indicia may include a low position, a high position, and an off position representing the only three levels of flammable gas available to a user. In other examples, the indicia may represent one or more positions on an analog scale ranging from no flammable gas to a particular amount of flammable gas.

Additionally, the ignition system 1104 may include a device that allows the flow of flammable gas from the gas port system 1102 after the flammable gas is ignited. For example, and in the particular example of FIG. 12, the ignition system 1104 includes a thermocouple 1216 coupled between the gas port system 1102 and the gas burner 1114. The thermocouple 1216 is latchable to allow flammable gas to flow to the gas burner 1114 when the controller 1214 is actuated. For example, the thermocouple 1216 may latch in response to a user manipulating the controller 1214 to ignite the gas burner 1114 and after an internal temperature (e.g., of the thermocouple 1216) reaches a defined value, after a defined period of time (e.g., 0.5 seconds, 1.5 seconds, 3 seconds, 5 seconds, etc.), etc. The thermocouple 1216 may unlatch after a temperature (e.g., of the thermocouple 1216, adjacent the gas burner 1114, etc.) is equal to, below, or above a defined value. For example, the thermocouple 1216 may unlatch based on a sensed temperature thereby blocking flammable gas from passing through conduits in the housing 1118 and to the gas burner 1114 when a flame from the gas burner 1114 is extinguished, reduces below a undesirable level, etc.

As shown in FIG. 11, the gas port system 1102 includes an input gas port 1218 that is removably coupled to a source of flammable gas. The input gas port 1218 may be shaped, sized, etc. to mate with conventional sources of flammable gas. For example, the gas port 1218 may include one or more conventional couplings for attaching the gas source to the removable unit 1100 via a hose or the like. The input gas port 1218 may include one or more quick connect/disconnect couplings if desired. Although not shown, the gas port system 1102 may include a shutoff valve (e.g., an emergency shutoff valve, etc.) to prohibit the fuel from reaching the gas burner 1114.

The functions of the controller 1214 may be performed by different user input components. In such cases, one component can be manipulated to adjust an amount of flammable gas received by the gas burner 1114 and another component can be manipulated to ignite the gas burner 1114.

Figure 13:
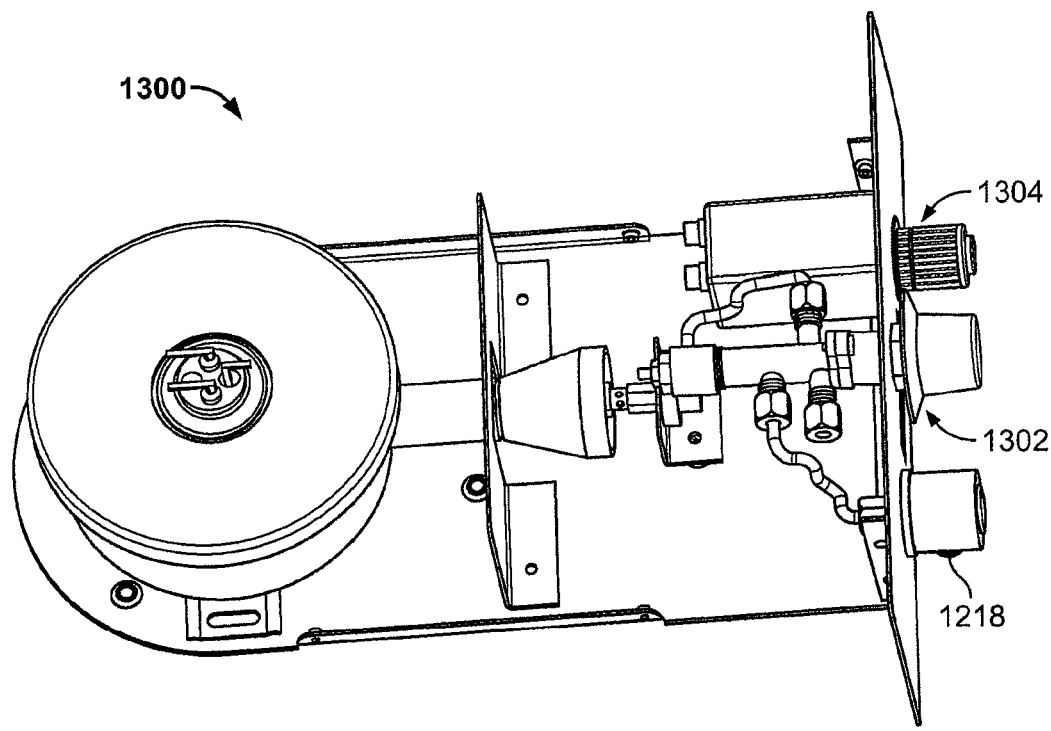
FIG. 13 is a top perspective view of a removable unit including an open flame burner.

For example FIG. 13 illustrates an example removable gas unit 1300 substantially similar to the removable gas unit 1100 of FIGS. 11 and 12. The removable gas unit 1300 includes a gas port system having the input gas port 1218 of FIG. 11, and a gas control system 1302 and an ignition system 1304. Similar to the controller 1214 of FIG. 12, the gas control system 1302 of FIG. 13 may include a rotatable user input to control an amount of flammable gas. The ignition system 1304 includes a user input (e.g., a push bottom) to generate a spark to ignite the flammable gas from the gas port system. In the particular example of FIG. 13, the ignition system 1304 includes an electronic igniter.

As explained above, a vessel may receive more than one removable unit. For example, one removable unit (e.g., the removable gas unit 110, 210, 1100 & 1300) may be removed, and another removable unit may be inserted into the vessel as explained above. The other removable unit may be, for example, an unit including a receptacle for collecting ashes from burnt charcoal, one or more vents to allow air to flow through the kamado-style grill, opening(s) for receiving a fire starter, etc. For example, FIGS. 14 and 15 illustrate removable units 1400, 1500 (sometimes referred to as removable charcoal units) insertable through an opening of a vessel for positioning below a fire bowl opening, as explained above.

Figure 14:
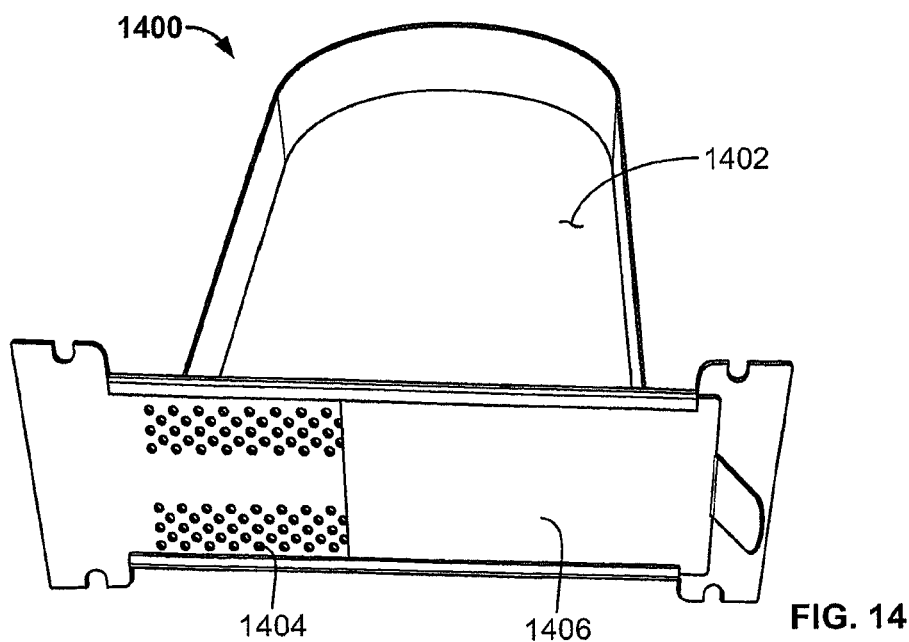
FIG. 14 is a top perspective view of a removable unit including an ash receptacle, vents and a slidable vent cover.

As shown in the FIG. 14, the removable charcoal unit 1400 includes an ash tray 1402, a vent (e.g., perforations 1404), and a vent cover 1406 for controlling the amount of air passing through the perforations 1404. In the particular example of FIG. 14, the vent cover 1406 is slidable to alter the number of perforations 1404 covered by the vent cover 1406.

Figure 15:
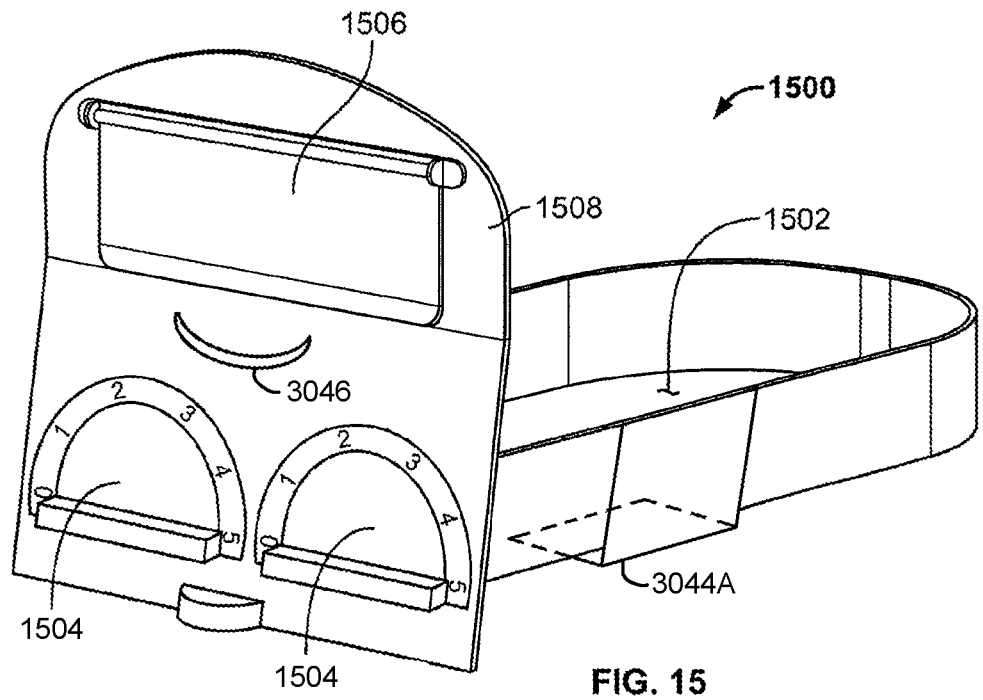
FIG. 15 is a perspective view of a removable unit including an ash receptacle and rotatable vent covers.

The removable charcoal unit 1500 of FIG. 15 includes an ash tray 1502, two vent covers 1504 for controlling the amount of air passing through vents (not shown), and a movable cover 1506 that covers an opening (not shown) for receiving a fire starter. In the particular example of FIG. 15, the vent covers 1504 are rotatable to alter the amount of area of the vents covered by the vent covers 1504. Additionally, the cover 1506 is pivotally coupled via one or more hinges to a faceplate 1508 of the unit 1500 to allow the cover 1506 to move thereby exposing the fire starter opening.

Although FIGS. 11-15 illustrate removable units each including specific components (e.g., the user inputs, controls, vents, etc.) at specific locations, it should be apparent that any one of the removable units may have more or less components including components of another removable unit. Additionally, the components of any one of the removable units may be positioned at any suitable location. For example, the removable gas unit 1100 of FIGS. 11 and 12 may include a push bottom ignition system (e.g., similar to the ignition system 1304 of FIG. 13) to generate a spark to ignite the flammable gas from the gas port system. This push bottom ignition system can be positioned adjacent to the input gas port 1218, the controller 1214, etc.

The kamado-style grills disclosed herein may include various different optional features. For example, one or more of the kamado-style grills may include an upper shell or lid coupled (e.g., detachably coupled, pivotally coupled, etc.) to a vessel. The upper shell or lid may include an optional vent system positioned adjacent a top of the kamado-style grills.

For example, and as shown in FIG. 1, the grill 100 includes an upper shell 116 coupled to the vessel 102 and a vent system 118 coupled to a top portion of the upper shell 116. In the particular example of FIG. 1, the upper shell 116 is pivotally coupled to the vessel 102 via one or more hinges 120. The vent system 118 includes one or more vents (e.g., openings, etc.) 122 to allow air, smoke, etc. to exhaust from the interior of the grill 100 and a vent cover 124 movable relative to the vent(s) for controlling the amount of air, smoke, etc. flowing through (and out of) the grill 100. The vent system 118 may work in conjunction with, for example, vent(s) of the charcoal units 1400, 1500 of FIGS. 14 and 15.

Figure 16:
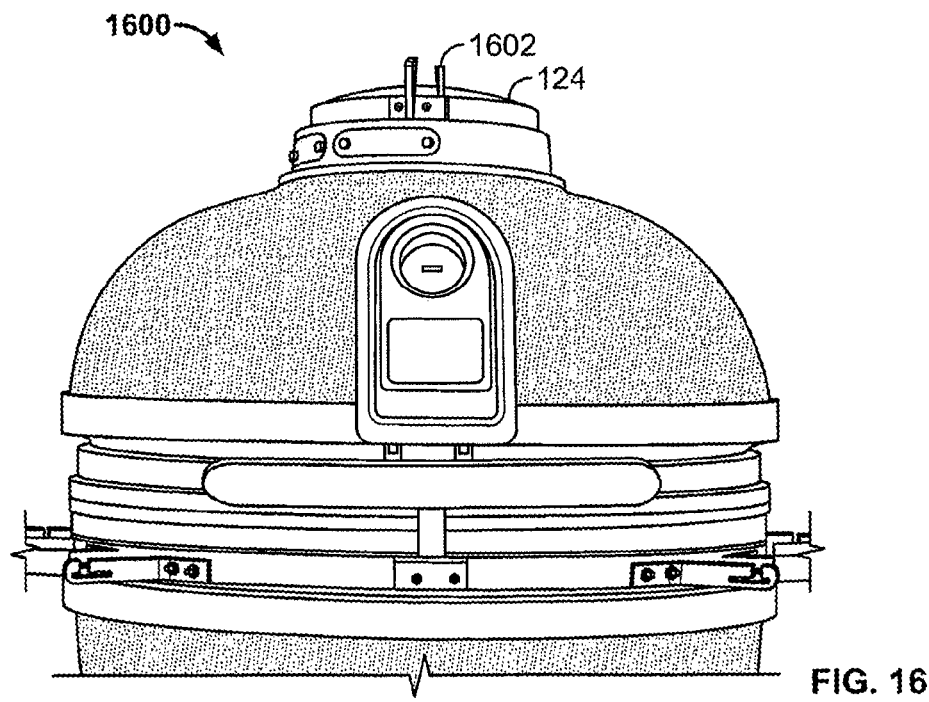
FIG. 16 is a front view of a kamado-style grill including a vent cover and a vent lock for locking the vent.

The vent cover may be locked in a particular position. For example, FIG. 16 illustrates a portion of a kamado-style grill 1600 substantially similar to the kamado-style grill 100 of FIG. 1. The grill 1600, however, includes a vent lock 1602 detachably coupled to the vent cover 124. When employed, the vent lock 1602 substantially prevents the vent cover 124 from moving relative to the vent(s) (not shown in FIG. 16). In some circumstances, it may be desired to keep the vents at least partially open, closed, etc. For example, if a removable gas unit is employed, it may be desired to keep the vents at least partially open in case a flame is extinguished and flammable gas continues to flow out of its gas burner. This may ensure the flammable gas can flow out of the kamado-style grill 1600.

Figure 17:
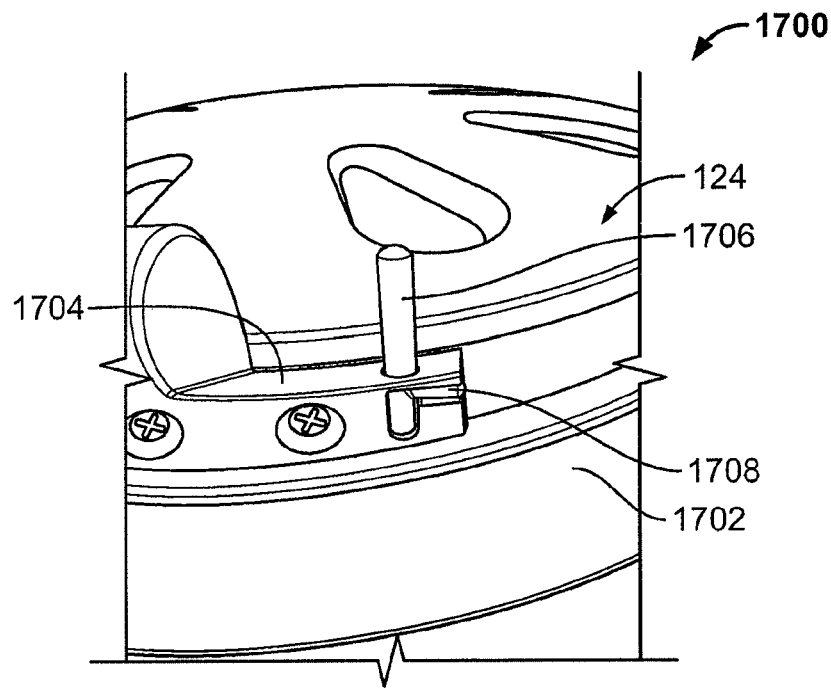
FIG. 17 is a zoomed in front perspective view of a vent cover and a vent lock including a removable pin.

The vent lock 1602 may include various different suitable devices that substantially prevent the vent cover 124 from moving. For example, FIG. 17 illustrates a vent system 1700 substantially similar to the vent system 118 of FIG. 1. The vent system 1700 includes a vent lock, a static platform 1702 that defines vent(s) (not shown in FIG. 17), and the vent cover 124 of FIG. 1 rotatably coupled to the platform 1702. In the particular example of FIG. 17, the vent lock includes a plate 1704 coupled to the vent cover 124 and defining an opening, and a pin 1706 slidable through the plate opening and removably coupled to the platform 1702 to substantially prevent the vent cover 124 from rotating relative to the vent(s). For example, the pin 1706 may be removably coupled to the platform 1702 by positioning the pin in an opening defined by the platform 1702. Alternatively, other suitable vent locks may be employed without departing from the scope of the disclosure.

As shown in FIG. 17, the pin 1706 can include a protruding member 1708. In such examples, the plate 1704 includes a cutout or the like that corresponds to the protruding member 1708. As such, if it is desired to prevent the vent cover 124 from moving, a user can rotate the pin 1706 such that the protruding member 1708 rotates away from the cutout to allow the pin 1706 to fall into the opening defined by the platform 1702. If it is desired to allow the vent cover 124 to move, a user can manipulate the pin 1706 such that the protruding member 1708 is adjacent the cutout of the plate 1704, as shown in FIG. 17.

Additionally and/or alternatively, the kamado-style grills disclosed herein may include an optional support frame for supporting the vessel, the fire bowl, and/or the lid. For example, the grill 100 of FIG. 1 includes a support frame 126 includes four legs 128 and wheels 130 (e.g., casters, etc.) coupled to the legs 128. As such, the grill 100 can be supported by the support frame 126 and be moved as desired.

Figure 18:
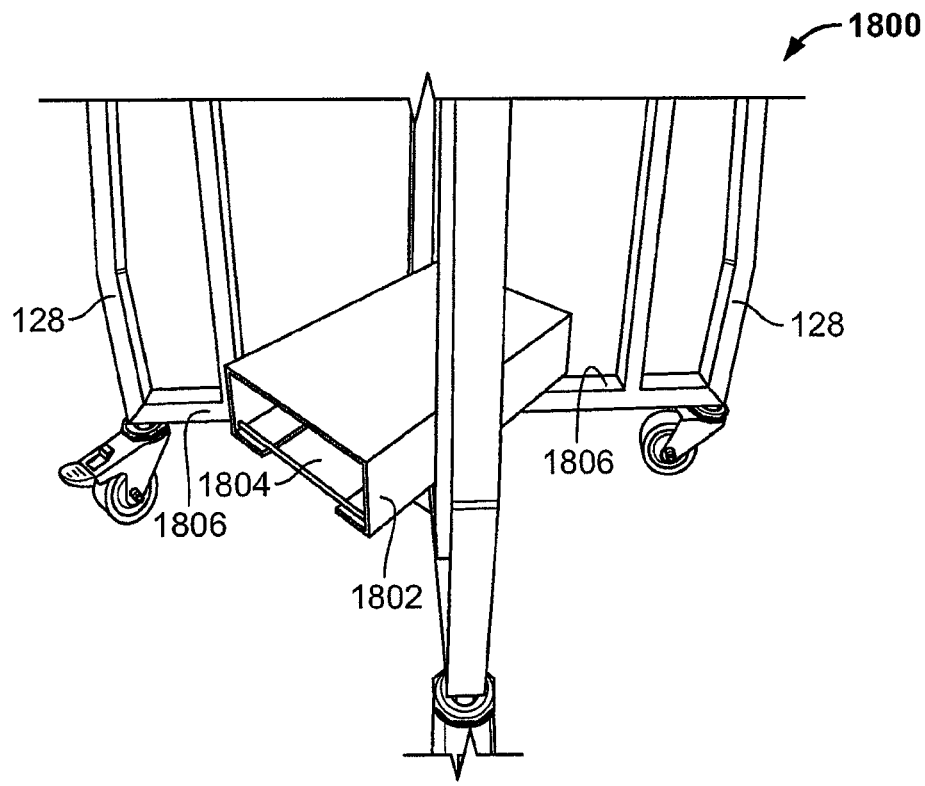
FIG. 18 is a perspective view of a support frame of a kamado-style grill and a removable unit sleeve coupled to the support frame.

The grills may include a sleeve for receiving a removable unit (e.g., one of the removable unit disclosed herein, etc.). For example, FIG. 18 illustrates a support frame 1800 of a kamado-style grill substantially similar to the support frame 126 of FIG. 1, but including a sleeve 1802 coupled to the support frame 1800. As shown, the sleeve 1802 defines an opening 1804 for receiving a removable unit. This allows a user to store the removable unit in the sleeve 1802 and use another removable unit for cooking purposes (if desired), as explained above. Thus, the sleeve 1802 can store the non-used removable unit when the other removable unit is inserted into the vessel.

Figure 19:
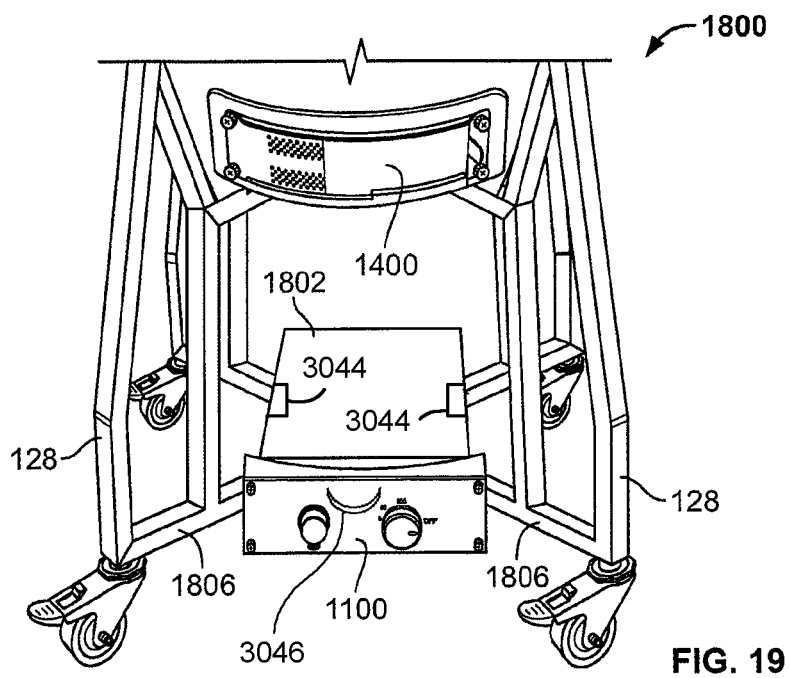
FIG. 19 is a front view of the support frame and sleeve of FIG. 18, where the sleeve is storing a removable gas unit.
Figure 20:
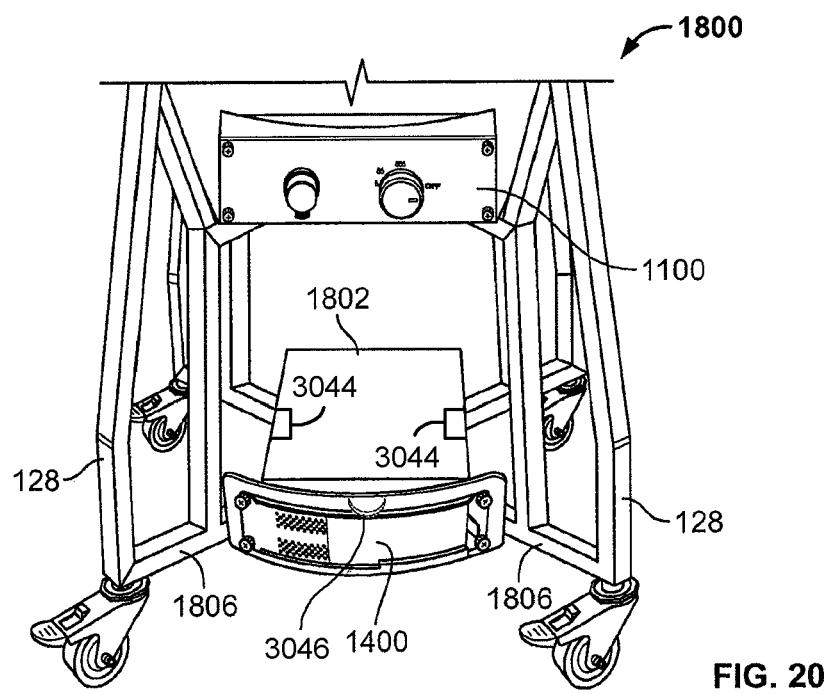
FIG. 20 is a front view of the support frame and sleeve of FIG. 18, where the sleeve is storing a removable charcoal unit.

For example, and as shown in FIG. 19, the removable gas unit 1100 of FIGS. 11 and 12 is positioned in the sleeve 1802 via its opening (not shown), and the removable charcoal unit 1400 of FIG. 14 is inserted in the vessel, as explained above. In other examples, the removable charcoal unit 1400 is positioned in the sleeve 1802, and the removable gas unit 1100 is inserted in the vessel, as shown in FIG. 20. Alternatively, other suitable removable units may be used if desired.

The support frame 1800 includes a base 1806 and the legs 128 extending between the base 1806 and a vessel. As shown in FIGS. 18-20, the sleeve 1802 is coupled to the base 1806 between the legs 128. As such, the sleeve 1802 is coupled to the support frame 1800 such that the opening 1804 extends in a substantially parallel direction relative to the ground supporting the grill. Alternatively, the sleeve 1802 may be coupled to the legs 128 and/or another suitable structure of the support frame 1800, grill, etc., and/or be orientated in another suitable manner (e.g., substantially perpendicular position relative to the ground, etc.).

Additionally and/or alternatively, the kamado-style grills may include an optional cart to support a gas source coupled (e.g., detachably coupled, etc.) to the support frame. For example, FIGS. 21 and 22 illustrate a support frame 2100 for supporting a vessel 2102 of a kamado-style grill, and a cart 2104 coupled to the support frame 2100. The cart 2104 may be coupled to the support frame 2100 via any suitable device, process, etc. For example, the cart 2104 may be welded to the frame 2100, coupled to the frame 2100 via one or more fastening devices (as shown in FIGS. 21 and 22), etc.

In the particular example of FIGS. 21 and 22, the cart 2104 includes a frame 2106 for supporting a gas source 2204, two bars 2108 extending between the frame 2106 and the support frame 2100, a wheel 2110 (e.g., a caster, etc.) coupled to the frame 2106, and mechanical fasteners 2112 for coupling the bars 2108 (and therefore the cart 2104) to the support frame 2100. The mechanical fasteners 2112 include a bracket that corresponds (e.g., shape, size, etc.) to a base 2114 of the support frame 2100 and a fastening device (e.g., a screw, a nut, a pin, etc.) for detachably coupling the bracket to the base 2114. As such, the cart 2104 may be coupled to the support frame 2100 via the mechanical fasteners 2112 such that the cart 2104 is attached to the kamado-style grill when the grill is used as a gas fired grill and detached from the kamado-style grill when the grill is used as a charcoal fired grill.

The frame 2106 may include an "I" shaped support formed into a substantially circular shape corresponding to a cross sectional shape of the gas source 2204. For example, the inner circumference of the frame 2106 may be slightly larger than an outer circumference of a portion of the gas source 2204 such that this portion of the gas source is able to extend into the circular shaped support when the gas source is coupled to the frame 2106. Although not shown, the frame 2106 may include one or more cross beams extending across the circular shaped support to provide additional stability, support, etc. Alternatively, other suitable supports formed into a different shape may be employed if desired.

As shown in FIG. 22, the gas source 2204 is coupled to the frame 2106 by resting on top of the support (and cross beams if employed), by manipulating one or more mechanical fasteners (e.g., screws, bolts, pins, nuts, etc.), etc. For example, the frame 2106 of FIGS. 21 and 22 includes a mechanical fastener 2116 that detachably couples the gas source 2204 to the cart 2104. In the particular example of FIGS. 21 and 22, the mechanical fastener 2116 includes a bolt and a rotatable knob coupled to the bolt allowing a user to rotate the bolt. The bolt can be rotated a desired amount such that the bolt is pressed against the gas source thereby securing the gas source in place.

The frame 2106 may be adjustable. For example, one or more mechanical fasteners may be manipulated to reduce and/or increase the size of the circular shaped support to accommodate various sized gas sources. Additionally and/or alternatively, one or more mechanical fasteners may be employed to change the shape of the frame 2106 to accommodate various shaped gas sources.

As shown in FIG. 22, the gas source 2204 may be detachably coupled to a gas unit (if employed) via a flexible hose 2122 as explained above. Alternatively, one or more other suitable conduits including other types of flexible hoses may be employed.

If desired, the hose 2122 can be secured to one or more legs 2120 of the support frame 2100 to ensure the hose does not interfere with the wheels of the kamado-style grill and/or the wheel 2110 of the cart 2104. For example, one or more routing devices 2118 may be coupled to the support frame 2100. As shown best in FIG. 21, the routing device 2118 includes a bracket coupled to one leg 2120 and a circular support coupled to the bracket. The hose 2122 can pass through the circular support of each routing device 2118 thereby securing the hose 2122 to the support frame 2100. Alternatively, other suitable devices such as clamps, etc. may be employed to secure the hose 2122 to the support frame 2100 and/or route the hose 2122 to the gas unit.

Preferably, the cart 2104 is coupled to the support frame 2100 and the gas source 2204 is coupled to the gas unit after the heat spreader 112 (if used) and the structure 902 (if used) are installed, as explained above. The cart 2104 may be coupled to the support frame 2100 and/or the gas source 2204 may be coupled to the gas unit before or after the gas unit is installed (as explained above), before the heat spreader 112 and/or the structure 902 are installed (as explained above), etc. if desired.

Figure 23:
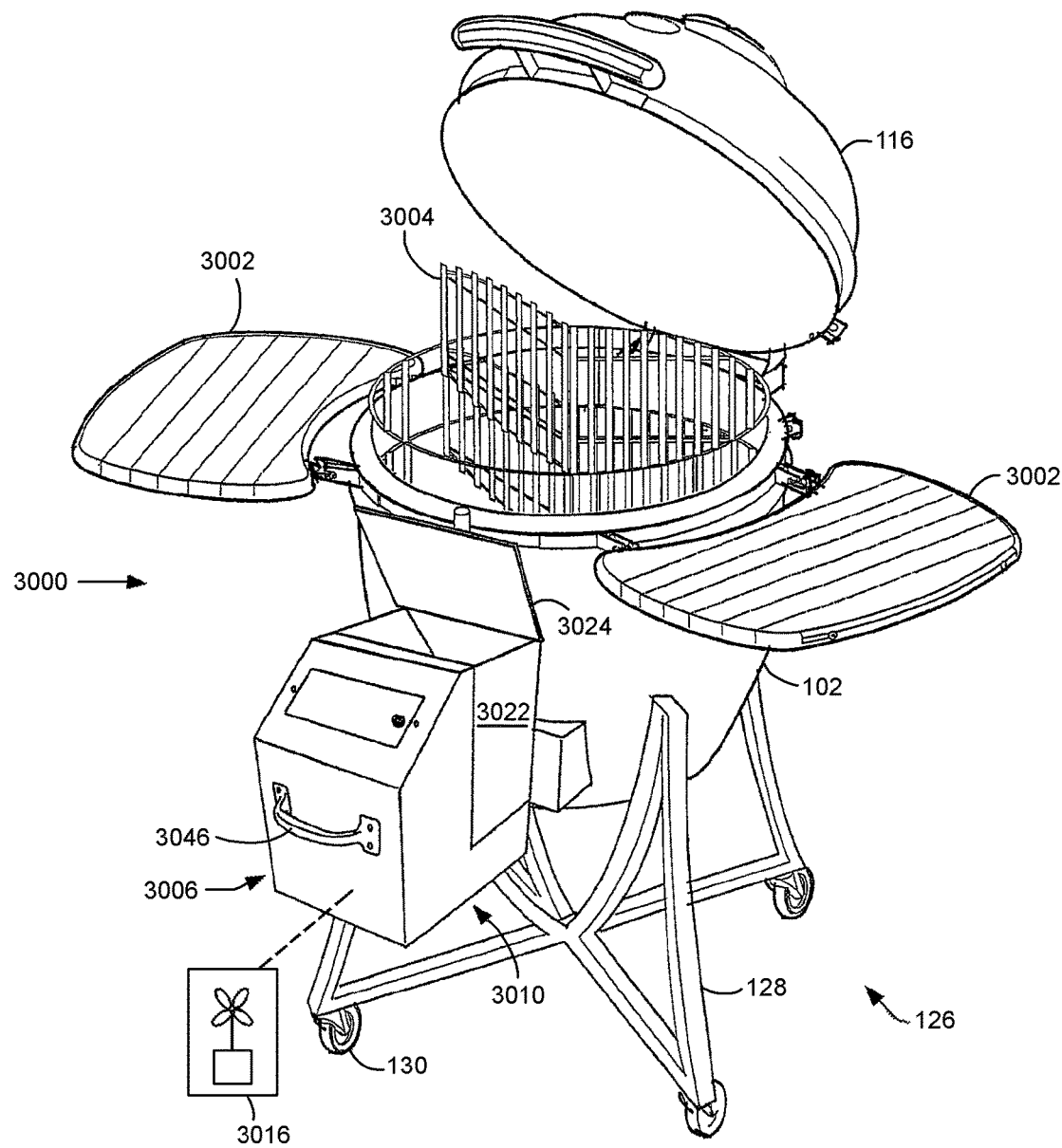
FIG. 23 shows an assembled grill that is fueled by pellets.
Figure 24:
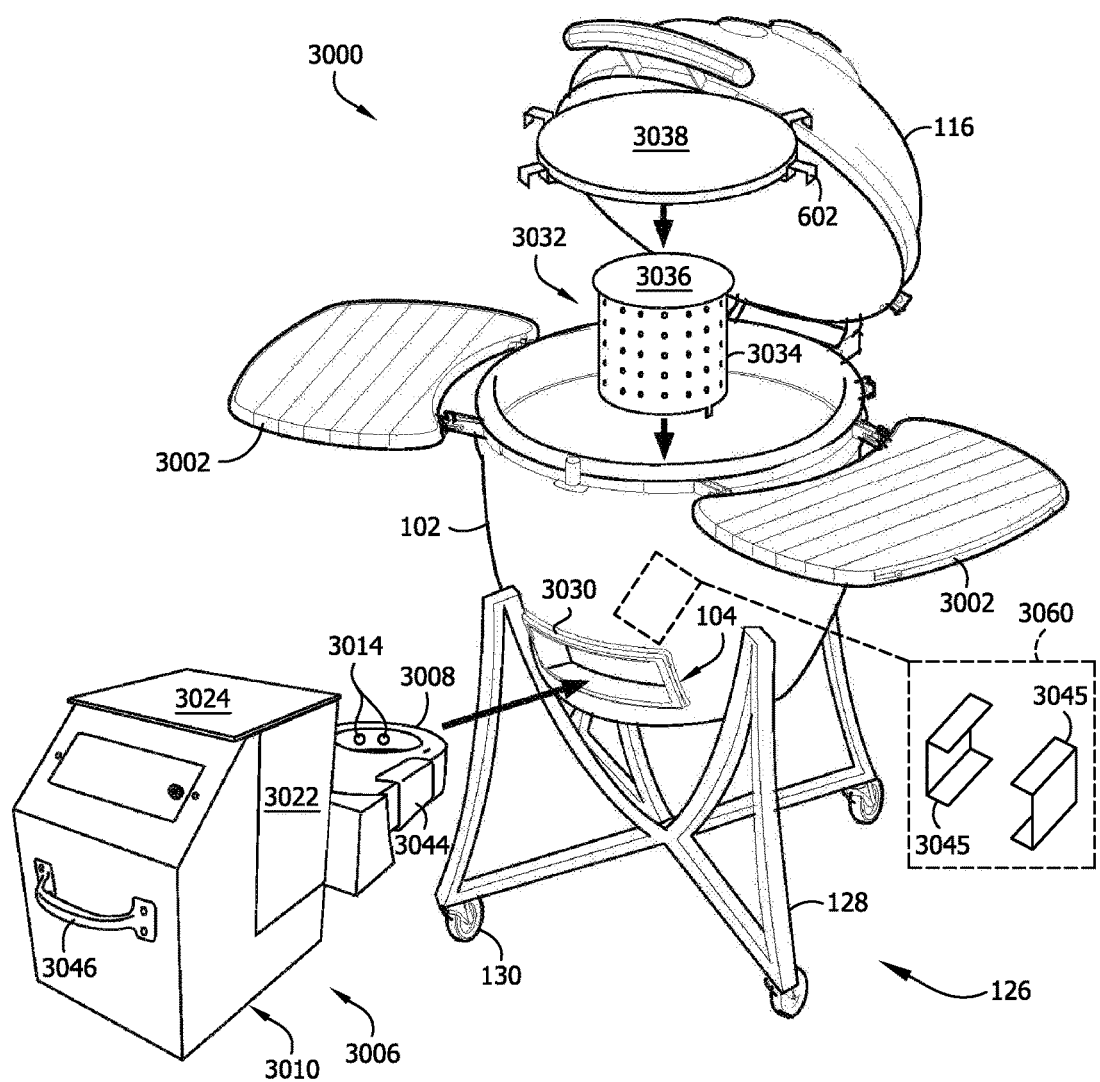
FIG. 24 shows the assembly of some components of a grill that is fueled by pellets.
Figure 25:
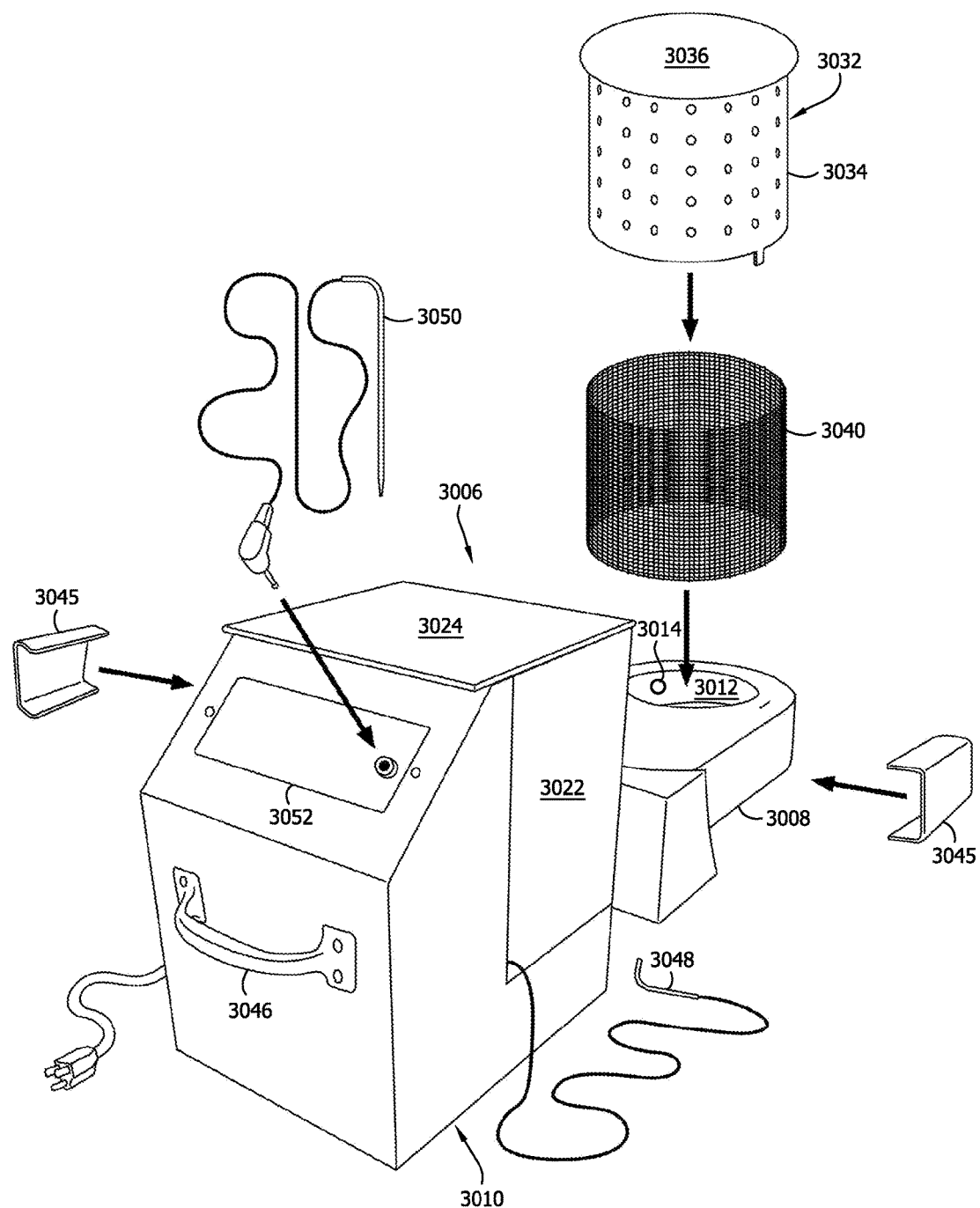
FIG. 25 shows a close up view of some of the component parts of a pellet feeder for the use of pellets as a fuel source.
Figure 26:
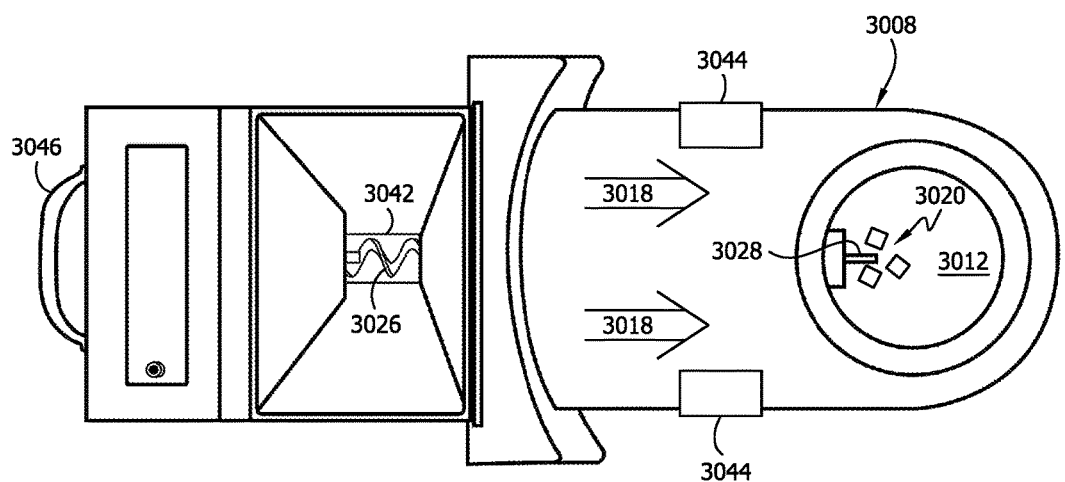
FIG. 26 shows a top view of a pellet feeder with the lid to the pellet box in the open position.
Figure 27:
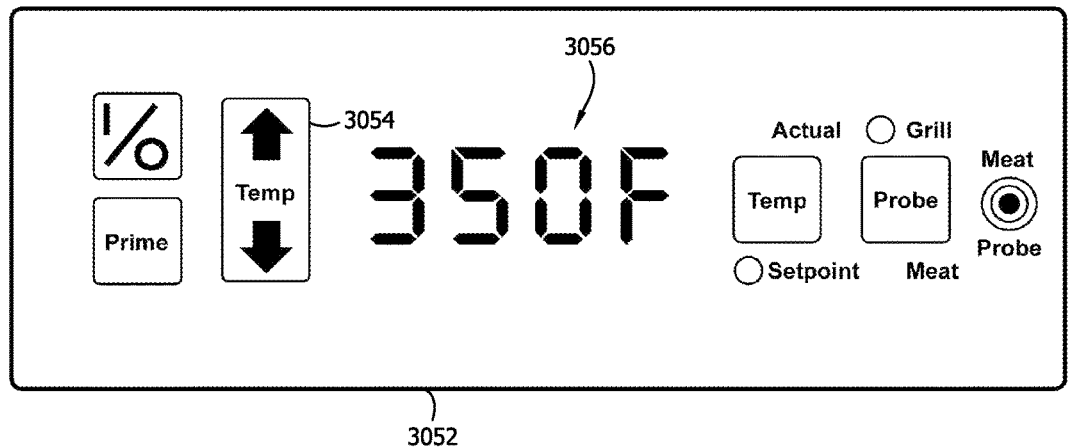
FIG. 27 shows a view of the control panel and display for setting a desired temperature for a grill and for connecting sensors to the controller.

FIGS. 23 and 24 show a grill 3000 supported on a support frame 126 having four legs 128 and wheels 130. Grill 3000 is shown there fueled by a pellet burner 3006. FIGS. 25 and 26 (top down view) show additional detail for the structure of the pellet burner 3006. FIG. 27 shows the control panel 3052 for controlling the pellet burner 3006.

More particularly, grill 3000 includes optional working surfaces 3002 on either side. Grill 3000 includes an upper shell 116 and a lower shell 102. Lower shell 102 defines an opening 104 there-through. Upper shell 116 and lower shell 102 together define a cooking chamber as seen in the space where the grate 3004 is found. Grate 3004 is used to support the food that will be cooked in the grill 3000. Lower shell 102 is substantially constructed from a clay, ceramic, refractory material, earthen material, cement rock, or terra cotta composition. The pellet burner 3006 is adapted to fit in the opening 104 in the lower shell 102. The pellet burner 3006 includes an air duct 3008 having a first end 3010 and a second end 3012, wherein the first end 3010 is positioned outside of the lower shell 102 and the second end 3012 is positioned inside of the lower shell 102 when the pellet burner 3006 is fitted in the opening 104 in the lower shell 102.

A fan 3016 is positioned at the bottom of the housing for the pellet burner 3006 and draw air into the housing through holes (not shown) that provide the first end 3010 of the air duct 3008. Fan 3016 blows air through the air duct 3008 as shown by arrows 3018 and through the second end 3012 of the air duct via air holes such as those shown by reference character 3014. Thus, the pathway for the air through air duct 3008 as driven by the fan 3016 is that the air enters the first end 3010 of the air duct 3008 via holes (not shown) in the underside of the base of the pellet burner 3006. The air is then pushed through the air duct as indicated by arrows 3018 towards the second end 3012 where the air exits the air duct via holes 3014. This air is used to support the combustion of exemplary pellets 3020 shown in FIG. 26.

The pellet burner 3006 includes a pellet box 3022 configured to hold a plurality of pellets. Pellet box 3022 includes a lid 3024. Lid 3024 is shown in the open position in FIG. 23. The sidewalls of pellet box 3022 preferably provide a funnel effect to direct the pellets to an auger 3026 positioned at the bottom of the pellet box 3022. Auger 3026 is configured to move pellets from the pellet box 3022 to a position adjacent the second end 3012 of the air duct 3008. A hot rod 3028 is positioned adjacent the second end 3012 of the air duct 3008 to ignite the pellets delivered by the auger 3026. The floor at the second end 3012 of air duct 3008 holds the pellets as they burn.

The pellet burner 3006 includes a gasket 3030. The gasket 3030 is adapted to seal the opening 104 in the lower shell 102 when the pellet burner 3006 is fitted in the opening 104.

The grill further comprising a latch (not shown) for releasably securing the pellet burner 3006 in the opening 104 in the lower shell 102. As seen, the second end 3012 of the air duct 3008 is positioned in a center position of the lower shell 102 when the pellet burner 3006 is fitted in the opening 104. A metal heat exchanger 3032 is adapted to be positioned at the second end 3012 of the air duct 3008. The metal heat exchanger 3032 preferably comprises a perforated cylindrical side wall 3034 and an unperforated flat top surface 3036. When in position over the second end 3012, the heat exchanger 3032 is sized to cover a plurality of burning pellets thereunder. A lava stone 3038 is supported with brackets 602 adapted to locate the lava stone 3038 above the metal heat exchanger 3032. A mesh screen 3040 is preferably sized to fit adjacent an interior surface of the metal heat exchanger 3032 to contain smaller ash particles. In use, the metal heat exchanger 3032 and the lava stone 3038 are preferably positioned over the second end 3012 of the air duct 3008 in a center position of the lower shell 102 when the pellet burner 3006 is fitted in the opening 104 in the lower shell 102.

Fan 3016 is positioned to both blow air through the air duct 3008 and also to apply a positive air pressure to the pellet box 3022 which is relieved through a passage 3042 containing the auger 3026.

Pellet burner 3006 may include a guide 3044 secured thereto for slidably mounting the pellet burner 3006 in the opening 104 in the lower shell 102. Lower shell 102 may include a corresponding track 3045 shown in phantom box 3060. Track 3045 is mounted inside the lower shell 102 to receive the pellet burner 3006. A handle 3046 secured to the pellet burner 3006 facilitates removal of the pellet burner 3006 from the lower shell 102. Guide 3044 is shown to have a cross section in the shape of a "C," such as that made from channel iron or any other suitable material. Guide 3044 may also be made from angle iron or any other suitable material such as that shown for guide 3044A attached to the removable charcoal unit 1500 in FIG. 15. Guides 3044 or 3044A may be attached to any pellet burner 3006, gas burner 210, charcoal unit 1500, or ash tray 1502 to make it easier to slidably mount these removable units in the opening 104. Alternatively, if the structure of such removable unit is sized for the opening 104, then guides 3044 or 3044A may not be needed, or may be used to strengthen the contact portion of the removable unit and/or protect it from wear. Track 3045 may also be used inside the lower shell 102 to receive such removable units and support them in position during grilling. Track 3045 is shown to have a cross section in the shape of a "C," such as that made from channel iron or any other suitable material. Track 3045 may also be made from angle iron or any other suitable material. FIGS. 2, 15, 19-20, 24 and 26 show the optional guides 3044/3044A connected to the respective removable receptacles shown there. The removable receptacles shown in FIGS. 1, 6, 10-14 and 25 do not include such optional guides.

Grill 3000 preferably includes a temperature sensor 3048 adapted to sense a temperature in the cooking chamber and/or a temperature sensor 3050 adapted to sense a temperature of a piece of food in the cooking chamber. A control panel 3052 includes an input switch 3054 adapted to provide a signal 3056 indicative of a desired temperature in the cooking chamber. A control circuit (not shown) is responsive to the temperature sensors 3048 and 3050 and the input switch 3054 for controlling a speed of the fan 3016 and a rate at which the auger 3026 moves pellets from the pellet box 3022 to a position adjacent the second end 3012 of the air duct 3008 as a function of the sensed temperature and the desired temperature.

Upper shell 116 and lower shell 102 of grill 3000 are preferably both constructed from a clay or ceramic composition.

A benefit of grill 3000 is that it can be fueled by pellet burner 3006 for burning wood pellets or other common pellet fuel, or if preferred, by a gas burner that is interchangeable with the pellet burner 3006. For example, the gas burners shown in FIGS. 1 & 6 (see insert 110); 2 (see insert 210); 11, 12, 19 & 20 (see removable gas unit 1100); and 13 (see removable gas unit 1300) are adapted to fit in the opening 104 in the lower shell 102 and can each be used interchangeably with pellet burner 3006. Again, such gas burners may use a propane gas burner with a metal heat exchanger positioned in a center position of the lower shell 102 when the gas burner is fitted in the opening 104.

Relatedly, a further benefit of grill 3000 is that it can also be fueled by conventional charcoal or wood. For example, the ash trays shown in FIGS. 14 (1402) and 15 (1502) can be used with the fire bowl 106 supported by the lower shell 102 in FIG. 6 to burn charcoal or wood. As seen, these ash trays are adapted to collect ash dropped from the fire bowl 106 and can each be used interchangeably with pellet burner 3006. These ash trays may be used with the other structures shown there, including the vents 1404 and vent covers 1406/1504 (covering vents not shown) for controlling the amount of air passing through the vents.

It is thus apparent to a person of ordinary skill in the art that grill 3000 may be readily fueled with pellets via an automatic feeder, with a propane burner, or with conventional charcoal or wood by simply replacing one fuel source for the other in opening 104 of lower shell 102.

The lower shell 102 and upper shell 116 may include a cavity respectively therein wherein each such cavity contains an insulation material (not shown).

The grills disclosed herein may be kamado-style grills. As such, one or more components of the grills such as the vessels/lower shells, the fire bowls, and/or the lids/upper shells disclosed herein may include one or more earthen materials (e.g., clay, ceramics, etc.).

The burner of the gas units (including the removable gas units, etc.) disclosed herein may include various different types of burners. For example, the gas units may include an infrared burner as shown in FIGS. 11 and 12, an open flame burner (or the like) as shown in FIG. 14, etc.

The flammable gas disclosed herein may include any suitable combustible gas, a combination of combustible gases, a combination of combustible gases and noncombustible gases, etc. For example, the gas may include natural gas, propane and/or another suitable gas. The flammable gas may be provided via a gas source such as a refillable tank (e.g., a propane tank), a gas line from a home gas system, etc.

Additionally, the charcoal disclosed herein may include any suitable material. For example, the charcoal may include lump charcoal, charcoal briquettes, wood, etc.

Having provided this detailed description, it will be apparent that modifications and variations are possible without departing from the scope of the invention defined in the appended claims.

In view of the above, it will be seen that the several objects of the invention are achieved and other advantageous results attained.

As various changes could be made in the above systems without departing from the scope of the invention, it is intended that all matter contained in the above description and shown in the accompanying drawings shall be interpreted as illustrative and not in a limiting sense.

What is claimed is:

1. A grill comprising:
   an upper shell;
   a lower shell, the lower shell defining an opening through a side wall thereof, and the upper shell and the lower shell together defining a cooking chamber; and
   a pellet burner adapted to fit in the opening through the side wall in the lower shell, the pellet burner further comprising:
   an air duct having a first end and a second end, wherein the first end is positioned outside of the lower shell and the second end is positioned inside of the lower shell when the pellet burner is fitted in the opening through the side wall in the lower shell;
   a fan positioned to blow air through the air duct and through the second end of the air duct;
   a pellet box configured to hold a plurality of pellets;
   an auger configured to move pellets from the pellet box to a combustion area at the second end of the air duct; and
   a hot rod positioned adjacent the second end of the air duct; and
   wherein the lower shell further comprises a track for slidably mounting the pellet burner in the opening through the side wall in the lower shell, and the pellet burner is sized to position the combustion area completely within the lower shell.

2. The grill of claim 1 wherein the lower shell is comprised of a clay, ceramic, refractory material, earthen material, cement rock, or terra cotta composition.

3. The grill of claim 2 wherein the upper shell and the lower shell are both constructed from the clay or ceramic composition.

4. The grill of claim 2 further comprising a gas burner interchangeable with the pellet burner and adapted to fit in the opening through the side wall in the lower shell.

5. The grill of claim 4 wherein at least one of the following:
   the gas burner further comprises a metal heat exchanger, wherein a combustion area of the gas burner and the metal heat exchanger is positioned in a center position of the lower shell when the gas burner is fitted in the opening through the side wall in the lower shell; or
   the grill further comprising a fire bowl adapted to be supported by the lower shell; and an ash tray interchangeable with the pellet burner and adapted to fit in the opening through the side wall in the lower shell wherein the ash tray is further adapted to collect ash dropped from the fire bowl; or
   the gas burner is adapted to be slidably mounted on the track through the opening through the side wall in the lower shell, and wherein an ash tray is adapted to be slidably mounted on the track through the opening through the side wall in the lower shell.

6. The grill of claim 2 wherein at least one of the following:
   the pellet burner further comprises a gasket, wherein the gasket is adapted to seal the opening through the side wall in the lower shell when the pellet burner is fitted in the opening through the side wall in the lower shell; or
   the pellet burner further comprises a latch for releasably securing the pellet burner in the opening through the side wall in the lower shell; or
   the pellet burner further comprises a handle secured to the pellet burner to facilitate removal of the pellet burner from the lower shell; or
   the fan is positioned to both blow air through the air duct and also to apply a positive air pressure to the pellet box which is relieved through a passage containing the auger; or
   the pellet burner further comprises a metal heat exchanger adapted to be positioned over the combustion area at the second end of the air duct; or
   the combustion area at the second end of the air duct is positioned in a center position of the lower shell when the pellet burner is fitted in the opening through the side wall in the lower shell.

7. The grill of claim 2 wherein the pellet burner further comprises a metal heat exchanger adapted to be positioned over the combustion area at the second end of the air duct, and at least one of the following:
   the metal heat exchanger further comprises a perforated cylindrical side wall and a solid top surface; or
   the heat exchanger is sized to cover a plurality of burning pellets thereunder; or
   the grill further comprises a lava stone and a support adapted to locate the lava stone above the metal heat exchanger; or
   the grill further comprises a lava stone and a support adapted to locate the lava stone above the metal heat exchanger and wherein the metal heat exchanger and the lava stone are positioned in a center position of the lower shell when the pellet burner is fitted in the opening through the side wall in the lower shell; or
   the grill further comprises a mesh screen sized to fit adjacent an interior surface of the metal heat exchanger.

8. The grill of claim 2 further comprising:
   a fire bowl adapted to be supported by the lower shell; and
   an ash tray interchangeable with the pellet burner and wherein the ash tray is adapted to fit in the opening through the side wall in the lower shell wherein the ash tray is further adapted to collect ash dropped from the fire bowl.

9. The grill of claim 1 wherein the pellet burner further comprises at least one of the following:
   a gasket, wherein the gasket is adapted to seal the opening through the side wall in the lower shell when the pellet burner is fitted in the opening through the side wall in the lower shell; or
   a latch for releasably securing the pellet burner in the opening through the side wall in the lower shell; or
   a handle secured to the pellet burner to facilitate removal of the pellet burner from the lower shell.

10. The grill of claim 1 wherein either:
    the combustion area at the second end of the air duct is sized to be positioned in a center position of the lower shell when the pellet burner is fitted in the opening through the side wall in the lower shell; or
    the fan is positioned to both blow air through the air duct and also to apply a positive air pressure to the pellet box which is relieved through a passage containing the auger.

11. The grill of claim 1 further comprising a metal heat exchanger adapted to be positioned at the second end of the air duct and over the combustion area.

12. The grill of claim 11 wherein at least one of the following:
    the heat exchanger is sized to cover a plurality of burning pellets thereunder; or the grill further comprises a lava stone and a support adapted to locate the lava stone above the metal heat exchanger; or the grill further comprises a mesh screen sized to fit adjacent an interior surface of the metal heat exchanger.

13. The grill of claim 1 further comprising:
a metal heat exchanger comprising a perforated cylindrical side wall and a solid top surface;
a lava stone; and
a support adapted to locate the lava stone above the heat exchanger; and
wherein the metal heat exchanger and the lava stone are positioned in a center position of the lower shell when the pellet burner is fitted in the opening through the side wall in the lower shell.

14. The grill of claim 13 wherein at least one of the following:
the combustion area at the second end of the air duct is positioned in a center position of the lower shell when the pellet burner is fitted in the opening through the side wall in the lower shell; or
the metal heat exchanger is sized to cover a plurality of burning pellets thereunder; or
the grill further comprises a mesh screen sized to fit adjacent an interior surface of the metal heat exchanger.

15. The grill of claim 1 further comprising:
a temperature sensor adapted to sense a temperature in the cooking chamber or a temperature of a piece of food in the cooking chamber;
an input switch adapted to provide a signal indicative of a desired temperature in the cooking chamber; and
a control circuit responsive to the temperature sensor and the input for controlling a speed of the fan and a rate at which the auger moves pellets from the pellet box to the combustion area at the second end of the air duct as a function of the sensed temperature and the desired temperature.

16. The grill of claim 1 further comprising a gas burner interchangeable with the pellet burner and adapted to fit in the opening through the side wall in the lower shell.

17. The grill of claim 16 wherein at least one of the following:
the gas burner further comprises a metal heat exchanger, wherein a combustion area of the gas burner and the metal heat exchanger are positioned in a center position of the lower shell when the gas burner is fitted in the opening through the side wall in the lower shell; or
the metal heat exchanger for the pellet burner is the same heat exchanger as the metal heat exchanger for the gas burner; or
the gas burner is adapted to be slidably mounted on the track through the opening through the side wall in the lower shell; or
the grill further comprises a fire bowl adapted to be supported by the lower shell; and an ash tray interchangeable with both the pellet burner and the gas burner and wherein the ash tray is adapted to fit in the opening through the side wall in the lower shell wherein the ash tray is further adapted to collect ash dropped from the fire bowl; or
the grill further comprises a fire bowl adapted to be supported by the lower shell; and an ash tray interchangeable with both the pellet burner and the gas burner and wherein the ash tray is adapted to fit in the opening through the side wall in the lower shell wherein the ash tray is further adapted to collect ash dropped from the fire bowl; and wherein the gas burner is adapted to be slidably mounted on the track through the opening through the side wall in the lower shell, and wherein the ash tray is adapted to be slidably mounted on the track through the opening through the side wall in the lower shell; or
a fire bowl adapted to be supported by the lower shell; and an ash tray interchangeable with the pellet burner and adapted to fit in the opening through the side wall in the lower shell wherein the ash tray is further adapted to collect ash dropped from the fire bowl.

18. The grill of claim 1 wherein both the upper shell and the lower shell include a cavity respectively therein wherein each such cavity contains an insulation material.

19. The grill of claim 18 further comprising:
a fire bowl adapted to be supported by the lower shell; and
an ash tray interchangeable with the pellet burner and wherein the ash tray is adapted to fit in the opening through the side wall in the lower shell wherein the ash tray is further adapted to collect ash dropped from the fire bowl.

20. The grill of claim 1 wherein the grill further comprises a gas burner interchangeable with the pellet burner and adapted to fit in the opening through the side wall in the lower shell, and at least one of the following:
the gas burner further comprises a metal heat exchanger, wherein a combustion area of the gas burner and the metal heat exchanger are positioned in a center position of the lower shell when the gas burner is fitted in the opening through the side wall in the lower shell; or
the gas burner is adapted to be slidably mounted on the track through the opening through the side wall in the lower shell; or
the grill further comprises a fire bowl adapted to be supported by the lower shell; and an ash tray interchangeable with both the pellet burner and the gas burner and wherein the ash tray is adapted to fit in the opening through the side wall in the lower shell wherein the ash tray is further adapted to collect ash dropped from the fire bowl; or
the gas burner is adapted to be slidably mounted on the track through the opening through the side wall in the lower shell, and wherein an ash tray is adapted to be slidably mounted on the track through the opening through the side wall in the lower shell.

21. The grill of claim 1 further comprising:
a temperature sensor adapted to sense a temperature in the cooking chamber or a temperature of a piece of food in the cooking chamber;
an input switch adapted to provide a signal indicative of a desired temperature in the cooking chamber; and
a control circuit responsive to the temperature sensor and the input for controlling a speed of the fan and a rate at which the auger moves pellets from the pellet box to the combustion area at the second end of the air duct as a function of the sensed temperature and the desired temperature.

22. A grill comprising:
an upper shell;
a lower shell, the lower shell defining an opening through a side wall thereof, and the upper shell and the lower shell together defining a cooking chamber; and
a pellet burner adapted to fit in the opening through the side wall in the lower shell, the pellet burner further comprising:
an air duct having a first end and a second end, wherein the first end is positioned outside of the lower shell and the second end is positioned inside of the lower shell when the pellet burner is fitted in the opening through the side wall in the lower shell;
a fan positioned to blow air through the air duct and through the second end of the air duct;
a pellet box configured to hold a plurality of pellets;
an auger configured to move pellets from the pellet box to a combustion area at the second end of the air duct;
a metal heat exchanger adapted to be positioned at the second end of the air duct; and
a hot rod positioned adjacent the second end of the air duct; and
wherein: the lower shell further comprises a track for slidably mounting the pellet burner in the opening through the side wall in the lower shell; the pellet burner is sized to position the combustion area completely within the lower shell; and either the metal heat exchanger is adapted to be completely within the lower shell, or the metal heat exchanger comprises a perforated cylindrical side wall and a solid top surface.

23. The grill of claim 22 further comprising a gas burner interchangeable with the pellet burner and adapted to fit in the opening through the side wall in the lower shell.

24. The grill of claim 23 wherein at least one of the following:
the gas burner further comprises a metal heat exchanger, wherein a combustion area of the gas burner and the metal heat exchanger are positioned in a center position of the lower shell when the gas burner is fitted in the opening through the side wall in the lower shell; or
the metal heat exchanger for the pellet burner is the same heat exchanger as the metal heat exchanger for the gas burner; or
the gas burner is adapted to be slidably mounted on the track through the opening through the side wall in the lower shell; or
the grill further comprises a fire bowl adapted to be supported by the lower shell; and an ash tray interchangeable with both the pellet burner and the gas burner and wherein the ash tray is adapted to fit in the opening through the side wall in the lower shell wherein the ash tray is further adapted to collect ash dropped from the fire bowl; or
the grill further comprises a fire bowl adapted to be supported by the lower shell; and an ash tray interchangeable with both the pellet burner and the gas burner and wherein the ash tray is adapted to fit in the opening through the side wall in the lower shell wherein the ash tray is further adapted to collect ash dropped from the fire bowl; and wherein the gas burner is adapted to be slidably mounted on the track through the opening through the side wall in the lower shell, and wherein the ash tray is adapted to be slidably mounted on the track through the opening through the side wall in the lower shell; or
a fire bowl adapted to be supported by the lower shell; and an ash tray interchangeable with the pellet burner and adapted to fit in the opening through the side wall in the lower shell wherein the ash tray is further adapted to collect ash dropped from the fire bowl.

25. A grill comprising:
an upper shell;
a lower shell, the lower shell defining an opening through a side wall thereof, and the upper shell and the lower shell together defining a cooking chamber; and
a pellet burner adapted to fit in the opening through the side wall in the lower shell, the pellet burner further comprising:
an air duct having a first end and a second end, wherein the first end is positioned outside of the lower shell and the second end is positioned inside of the lower shell when the pellet burner is fitted in the opening through the side wall in the lower shell;
a fan positioned to blow air through the air duct and through the second end of the air duct;
a pellet box configured to hold a plurality of pellets;
an auger configured to move pellets from the pellet box to a combustion area at the second end of the air duct;
a hot rod positioned adjacent the second end of the air duct; and
wherein:
the lower shell further comprises a track for slidably mounting the pellet burner in the opening through the side wall in the lower shell;
the lower shell comprises a floor, a surface of the lower shell is generally symmetric about an axis of symmetry projecting vertically from the floor, and the axis of symmetry passes through the combustion area at the second end of the air duct; and
the pellet burner is sized to position the combustion area completely within the lower shell.

26. The grill of claim 25, wherein the grill further comprises:
a gas burner interchangeable with the pellet burner and adapted to fit in the opening through the side wall in the lower shell; and
a metal heat exchanger adapted for use with both the pellet burner and the gas burner.

27. A grill comprising:
an upper shell;
a lower shell, the lower shell defining an opening through a side wall thereof, and the upper shell and the lower shell together defining a cooking chamber; and
a pellet burner adapted to fit in the opening through the side wall in the lower shell, the pellet burner further comprising:
an air duct having a first end and a second end, wherein the first end is positioned outside of the lower shell and the second end is positioned inside of the lower shell when the pellet burner is fitted in the opening through the side wall in the lower shell;
a fan positioned to blow air through the air duct and through the second end of the air duct;
a pellet box configured to hold a plurality of pellets;
an auger configured to move pellets from the pellet box to a combustion area at the second end of the air duct; and
a hot rod positioned adjacent the second end of the air duct; and
wherein;
the grill further comprises a gas burner interchangeable with the pellet burner;
the lower shell further comprises a track for slidably mounting the pellet burner or the gas burner in the opening through the side wall in the lower shell;
the pellet burner is sized to position the combustion area of the pellet burner completely within the lower shell, and the gas burner is sized to position a combustion area of the gas burner completely within the lower shell; and the combustion area of the gas burner slides to the same position when the gas burner is fitted in the opening through the side wall of the lower shell as the combustion area of the pellet burner when the pellet burner is fitted in the opening through the side wall in the lower shell.

28. The grill of claim 27, wherein the grill further comprises a metal heat exchanger adapted for use with both the pellet burner and the gas burner.

* * * * *